ized Patent

(12) United States Patent
Poothia et al.

(10) Patent No.: US 12,306,733 B2
(45) Date of Patent: May 20, 2025

(54) KEY VALUE STORE IN A CLUSTERED CONTAINERIZED SYSTEM

(71) Applicant: Nutanix, Inc., San Jose, CA (US)

(72) Inventors: Gaurav Poothia, Redmond, WA (US); Heiko Koehler, San Jose, CA (US); Pankit Thapar, Seattle, WA (US)

(73) Assignee: Nutanix, Inc., San Jose, CA (US)

( * ) Notice: Subject to any disclaimer, the term of this patent is extended or adjusted under 35 U.S.C. 154(b) by 25 days.

(21) Appl. No.: 17/139,325

(22) Filed: Dec. 31, 2020

(65) Prior Publication Data
US 2022/0121543 A1 Apr. 21, 2022

Related U.S. Application Data

(60) Provisional application No. 63/094,733, filed on Oct. 21, 2020.

(51) Int. Cl.
G06F 11/30 (2006.01)
G06F 11/14 (2006.01)
G06F 11/20 (2006.01)
H04L 41/0803 (2022.01)
H04L 67/00 (2022.01)

(52) U.S. Cl.
CPC ...... G06F 11/3006 (2013.01); G06F 11/1435 (2013.01); G06F 11/2041 (2013.01); H04L 41/0803 (2013.01); H04L 67/34 (2013.01)

(58) Field of Classification Search
CPC ............. G06F 11/3006; G06F 11/1435; G06F 11/2041; H04L 41/0803; H04L 67/34
USPC ......................................................... 717/176
See application file for complete search history.

(56) References Cited

U.S. PATENT DOCUMENTS

| 6,115,830 A | 9/2000 | Zabarsky et al. |
| 6,550,057 B1 | 4/2003 | Bowman-Amuah |
| 7,237,360 B2 | 7/2007 | Moncho et al. |
| 7,310,664 B1 | 12/2007 | Merchant et al. |
| 7,516,221 B2 | 4/2009 | Souder et al. |
| 8,086,895 B2 | 12/2011 | Maki et al. |
| 8,195,976 B2 | 6/2012 | Rao et al. |

(Continued)

FOREIGN PATENT DOCUMENTS

| CN | 101916200 B | 8/2015 |
| CN | 110795442 B | 4/2022 |

(Continued)

OTHER PUBLICATIONS

"Anthos", Google Cloud https://cloud.google.com/anthos, Apr. 21, 2020, pp. 1-26.

(Continued)

Primary Examiner — Thuy Dao
Assistant Examiner — Zengpu Wei
(74) Attorney, Agent, or Firm — Stoel Rives LLP

(57) ABSTRACT

A containerized clustered computing system may be used to provide a platform as a service (PaaS) environment. The clustered system may be configured by initiating a bootstrap node including a first cluster infrastructure orchestrator and first container orchestrator and migrating cluster metadata to a key value store of the first container orchestrator. A second node in the cluster may be initiated by configuring a second cluster infrastructure orchestrator of the second node with a dependency on the first container orchestrator of the bootstrap node.

30 Claims, 4 Drawing Sheets

(56) References Cited

U.S. PATENT DOCUMENTS

| | | |
|---|---|---|
| 8,543,665 B2 | 9/2013 | Ansari et al. |
| 8,549,518 B1 | 10/2013 | Aron |
| 8,572,138 B2 | 10/2013 | Sundar et al. |
| 8,601,473 B1 | 12/2013 | Aron et al. |
| 8,700,946 B2 | 4/2014 | Reddy et al. |
| 8,850,130 B1 | 9/2014 | Aron et al. |
| 8,863,124 B1 | 10/2014 | Aron |
| 8,977,886 B2 | 3/2015 | Bauer et al. |
| 9,009,106 B1 | 4/2015 | Aron et al. |
| 9,027,024 B2 | 5/2015 | Mick et al. |
| 9,069,708 B2 | 6/2015 | Gill et al. |
| 9,176,829 B2 | 11/2015 | Jain et al. |
| 9,210,534 B1 | 12/2015 | Matthieu et al. |
| 9,244,951 B2 | 1/2016 | Mandelstein et al. |
| 9,253,252 B2 | 2/2016 | Agarwal et al. |
| 9,336,132 B1 | 5/2016 | Aron et al. |
| 9,600,494 B2 | 3/2017 | Maluf et al. |
| 9,606,794 B1 | 3/2017 | Chou et al. |
| 9,633,197 B2 | 4/2017 | Lakshmanan et al. |
| 9,634,893 B2 | 4/2017 | Boutros et al. |
| 9,641,650 B2 | 5/2017 | Virkki et al. |
| 9,652,265 B1 | 5/2017 | Narayanasamy et al. |
| 9,684,502 B2 | 6/2017 | Fu et al. |
| 9,729,411 B2 | 8/2017 | Purusothaman |
| 9,736,194 B1 | 8/2017 | Rao et al. |
| 9,747,176 B2 | 8/2017 | Oppermann |
| 9,747,287 B1 | 8/2017 | Bhardwaj et al. |
| 9,769,032 B1 * | 9/2017 | Ghodsi .............. G06F 11/3006 |
| 9,772,866 B1 | 9/2017 | Aron et al. |
| 9,785,513 B2 | 10/2017 | Ben-Or et al. |
| 9,836,234 B2 | 12/2017 | Colgrove et al. |
| 9,836,296 B2 | 12/2017 | Vandikas et al. |
| 9,848,041 B2 | 12/2017 | Einkauf et al. |
| 9,860,677 B1 | 1/2018 | Agerstam et al. |
| 9,917,865 B2 | 3/2018 | Arora et al. |
| 9,921,769 B2 | 3/2018 | Aron et al. |
| 9,948,711 B2 | 4/2018 | Cors et al. |
| 9,977,415 B2 | 5/2018 | Zimmerman et al. |
| 10,002,058 B1 | 6/2018 | Shanmugam et al. |
| 10,091,270 B2 | 10/2018 | Fang |
| 10,149,154 B2 | 12/2018 | Zimmerman et al. |
| 10,156,842 B2 | 12/2018 | Wu et al. |
| 10,181,978 B1 | 1/2019 | Argenti |
| 10,225,335 B2 | 3/2019 | Fu et al. |
| 10,230,798 B2 | 3/2019 | Doraiswamy et al. |
| 10,262,019 B1 | 4/2019 | Reiner et al. |
| 10,291,714 B2 | 5/2019 | Mathews et al. |
| 10,305,747 B2 | 5/2019 | Shahab et al. |
| 10,306,513 B2 | 5/2019 | Bartfai-Walcott et al. |
| 10,346,252 B1 | 7/2019 | Gould et al. |
| 10,372,565 B2 | 8/2019 | Peng et al. |
| 10,467,216 B2 | 11/2019 | Aron et al. |
| 10,489,138 B1 | 11/2019 | Wu et al. |
| 10,515,119 B2 | 12/2019 | Kirk et al. |
| 10,534,629 B1 | 1/2020 | St. Pierre et al. |
| 10,567,925 B2 | 2/2020 | Ly et al. |
| 10,652,226 B2 | 5/2020 | Islam et al. |
| 10,657,012 B2 | 5/2020 | Madduri et al. |
| 10,671,445 B2 | 6/2020 | Nucci et al. |
| 10,685,295 B1 | 6/2020 | Ross et al. |
| 10,726,302 B2 | 7/2020 | Zhang et al. |
| 10,769,113 B2 | 9/2020 | Jones |
| 10,776,213 B2 | 9/2020 | Chakankar et al. |
| 10,831,525 B2 | 11/2020 | Ramesh et al. |
| 10,838,833 B1 | 11/2020 | Jibaja et al. |
| 10,846,079 B2 | 11/2020 | Olderdissen et al. |
| 10,846,129 B2 | 11/2020 | Hermenier |
| 10,877,791 B2 | 12/2020 | Ramesh et al. |
| 10,884,808 B2 | 1/2021 | Chintalapally et al. |
| 10,893,116 B1 | 1/2021 | Koehler |
| 10,895,997 B2 | 1/2021 | Franciosi et al. |
| 10,924,342 B2 | 2/2021 | Joshi et al. |
| 10,963,283 B2 | 3/2021 | Lu et al. |
| 10,963,356 B2 | 3/2021 | Gill et al. |
| 11,108,849 B2 | 8/2021 | Tofighbakhsh et al. |
| 11,178,213 B2 | 11/2021 | Desai et al. |
| 11,194,483 B1 | 12/2021 | Dontu et al. |
| 11,301,762 B1 | 4/2022 | Chen et al. |
| 11,316,733 B1 | 4/2022 | Johson et al. |
| 11,379,525 B1 | 7/2022 | Deutsch et al. |
| 11,397,692 B2 | 7/2022 | Chhabra et al. |
| 11,409,756 B1 | 8/2022 | Park et al. |
| 11,422,863 B2 | 8/2022 | Sengupta et al. |
| 11,429,893 B1 | 8/2022 | Tong |
| 11,501,881 B2 | 11/2022 | Patil et al. |
| 11,579,991 B2 | 2/2023 | Gill et al. |
| 11,635,990 B2 | 4/2023 | Singh et al. |
| 11,665,221 B2 | 5/2023 | Joshi et al. |
| 11,726,764 B2 | 8/2023 | Joshi et al. |
| 12,021,915 B2 | 6/2024 | Joshi et al. |
| 12,026,551 B2 | 7/2024 | Singh et al. |
| 12,155,731 B2 | 11/2024 | Joshi et al. |
| 12,159,178 B2 | 12/2024 | Patil et al. |
| 2002/0143819 A1 | 10/2002 | Han et al. |
| 2004/0177359 A1 | 9/2004 | Bauch et al. |
| 2005/0060328 A1 | 3/2005 | Suhonen et al. |
| 2006/0130042 A1 | 6/2006 | Dias et al. |
| 2007/0233698 A1 | 10/2007 | Sundar et al. |
| 2008/0270515 A1 | 10/2008 | Chen et al. |
| 2009/0204711 A1 | 8/2009 | Binyamin |
| 2009/0260004 A1 | 10/2009 | Datta et al. |
| 2010/0008510 A1 | 1/2010 | Zayas |
| 2010/0077473 A1 | 3/2010 | Takeshita et al. |
| 2010/0175061 A1 | 7/2010 | Maeda et al. |
| 2010/0250824 A1 | 9/2010 | Belay |
| 2011/0153824 A1 | 6/2011 | Chikando et al. |
| 2011/0231899 A1 | 9/2011 | Pulier et al. |
| 2011/0251992 A1 | 10/2011 | Bethlehem et al. |
| 2011/0265077 A1 | 10/2011 | Collison et al. |
| 2012/0102486 A1 | 4/2012 | Yendluri |
| 2012/0167081 A1 | 6/2012 | Sedayao et al. |
| 2012/0265884 A1 | 10/2012 | Zhang et al. |
| 2012/0266156 A1 | 10/2012 | Spivak et al. |
| 2012/0281708 A1 | 11/2012 | Chauhan et al. |
| 2013/0219479 A1 | 8/2013 | Desoto et al. |
| 2013/0227573 A1 | 8/2013 | Morsi et al. |
| 2013/0304903 A1 | 11/2013 | Mick et al. |
| 2013/0332916 A1 | 12/2013 | Chinn et al. |
| 2014/0074539 A1 | 3/2014 | Doering et al. |
| 2014/0075412 A1 | 3/2014 | Kannan et al. |
| 2014/0075431 A1 | 3/2014 | Kumar et al. |
| 2014/0164486 A1 | 6/2014 | Ravinchandran et al. |
| 2014/0279899 A1 | 9/2014 | Gu et al. |
| 2014/0317261 A1 | 10/2014 | Shatzkamer et al. |
| 2014/0330948 A1 | 11/2014 | Dunn et al. |
| 2014/0372508 A1 | 12/2014 | Fausak et al. |
| 2015/0057817 A1 | 2/2015 | Endrizzi et al. |
| 2015/0067030 A1 | 3/2015 | Smith et al. |
| 2015/0074106 A1 | 3/2015 | Ji |
| 2015/0089504 A1 | 3/2015 | Hartman et al. |
| 2015/0120893 A1 | 4/2015 | Sapaliga et al. |
| 2015/0261876 A1 | 9/2015 | Trikha et al. |
| 2015/0339200 A1 | 11/2015 | Madduri et al. |
| 2015/0347542 A1 | 12/2015 | Sullivan et al. |
| 2015/0370502 A1 | 12/2015 | Aron et al. |
| 2016/0007138 A1 | 1/2016 | Palanisamy et al. |
| 2016/0026541 A1 | 1/2016 | Gill et al. |
| 2016/0092176 A1 | 3/2016 | Straub et al. |
| 2016/0092180 A1 | 3/2016 | Straub |
| 2016/0092348 A1 | 3/2016 | Straub et al. |
| 2016/0094398 A1 | 3/2016 | Choudhury et al. |
| 2016/0098265 A1 | 4/2016 | Mahajan et al. |
| 2016/0112268 A1 | 4/2016 | Chung et al. |
| 2016/0156614 A1 | 6/2016 | Jain et al. |
| 2016/0179635 A1 | 6/2016 | Kondalsamy et al. |
| 2016/0197830 A1 | 7/2016 | Ulevitch et al. |
| 2016/0202964 A1 | 7/2016 | Butcher et al. |
| 2016/0204977 A1 | 7/2016 | Cui et al. |
| 2016/0216959 A1 | 7/2016 | Kurian et al. |
| 2016/0234071 A1 | 8/2016 | Nambiar et al. |
| 2016/0246528 A1 | 8/2016 | Colgrove et al. |
| 2016/0315848 A1 | 10/2016 | Weinstein |
| 2016/0315912 A1 | 10/2016 | Mayya et al. |
| 2016/0323161 A1 | 11/2016 | Cuervo Laffaye et al. |

(56) References Cited

U.S. PATENT DOCUMENTS

| | | |
|---|---|---|
| 2016/0323361 A1 | 11/2016 | Austel et al. |
| 2016/0323377 A1 | 11/2016 | Einkauf et al. |
| 2016/0337104 A1 | 11/2016 | Kalligudd |
| 2016/0337175 A1 | 11/2016 | Rao |
| 2016/0342906 A1 | 11/2016 | Shaashua et al. |
| 2016/0344745 A1 | 11/2016 | Johnson et al. |
| 2016/0345516 A1 | 12/2016 | Britt et al. |
| 2016/0357525 A1 | 12/2016 | Wee et al. |
| 2016/0378622 A1 | 12/2016 | Ren et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0097950 A1 | 4/2017 | Meacham et al. |
| 2017/0099176 A1 | 4/2017 | Jain |
| 2017/0102931 A1 | 4/2017 | Risbood et al. |
| 2017/0116100 A1 | 4/2017 | Hayes et al. |
| 2017/0123939 A1 | 5/2017 | Maheshwari et al. |
| 2017/0126809 A1 | 5/2017 | Chen et al. |
| 2017/0142068 A1 | 5/2017 | Devarajan et al. |
| 2017/0149931 A1 | 5/2017 | Lochhead et al. |
| 2017/0168813 A1 | 6/2017 | Pogrebinsky et al. |
| 2017/0171607 A1 | 6/2017 | Britt |
| 2017/0177334 A1 | 6/2017 | Chou et al. |
| 2017/0177877 A1 | 6/2017 | Suarez et al. |
| 2017/0180272 A1 | 6/2017 | Bernath |
| 2017/0180346 A1 | 6/2017 | Suarez et al. |
| 2017/0185507 A1 | 6/2017 | Eberlein |
| 2017/0185922 A1 | 6/2017 | Lange et al. |
| 2017/0187807 A1 | 6/2017 | Clernon |
| 2017/0201411 A1 | 7/2017 | Mladin et al. |
| 2017/0201585 A1 | 7/2017 | Doraiswamy et al. |
| 2017/0212718 A1 | 7/2017 | Nelson et al. |
| 2017/0213157 A1 | 7/2017 | Bugay et al. |
| 2017/0244600 A1 | 8/2017 | Hussein et al. |
| 2017/0257432 A1 | 9/2017 | Fu et al. |
| 2017/0289173 A1 | 10/2017 | Resch et al. |
| 2017/0315820 A1 | 11/2017 | Entezari et al. |
| 2017/0347264 A1 | 11/2017 | Holland et al. |
| 2018/0007055 A1 | 1/2018 | Infante-lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1 | 4/2018 | Mahindru et al. |
| 2018/0109395 A1 | 4/2018 | Berdy et al. |
| 2018/0109650 A1 | 4/2018 | Berdy et al. |
| 2018/0109929 A1 | 4/2018 | Ly et al. |
| 2018/0123820 A1 | 5/2018 | Kim |
| 2018/0159745 A1 | 6/2018 | Byers et al. |
| 2018/0165166 A1 | 6/2018 | Wang et al. |
| 2018/0167392 A1 | 6/2018 | Zakaria |
| 2018/0212970 A1 | 7/2018 | Chen et al. |
| 2018/0219877 A1 | 8/2018 | Hsu et al. |
| 2018/0234351 A1 | 8/2018 | Amento et al. |
| 2018/0293463 A1 | 10/2018 | Brown |
| 2018/0295194 A1 | 10/2018 | Deraz et al. |
| 2018/0300124 A1 | 10/2018 | Malladi et al. |
| 2018/0302266 A1 | 10/2018 | Makovsky et al. |
| 2018/0302340 A1 | 10/2018 | Alvarez Callau et al. |
| 2018/0307464 A1 | 10/2018 | Bijani et al. |
| 2018/0307537 A1 | 10/2018 | Chen et al. |
| 2018/0309819 A1 | 10/2018 | Thompson |
| 2018/0314808 A1 | 11/2018 | Casey et al. |
| 2018/0324204 A1 | 11/2018 | Mcclory et al. |
| 2018/0332116 A1 | 11/2018 | George et al. |
| 2018/0338242 A1 | 11/2018 | Li et al. |
| 2018/0373419 A1 | 12/2018 | Chen et al. |
| 2018/0373555 A1 | 12/2018 | Gupta et al. |
| 2019/0014048 A1 | 1/2019 | Krishna Singuru |
| 2019/0018951 A1 | 1/2019 | James et al. |
| 2019/0026082 A1 | 1/2019 | Shalev et al. |
| 2019/0034837 A1 | 1/2019 | Lou et al. |
| 2019/0041824 A1 | 2/2019 | Chavez et al. |
| 2019/0045033 A1 | 2/2019 | Agerstam et al. |
| 2019/0068445 A1 | 2/2019 | Chauhan et al. |
| 2019/0087220 A1 | 3/2019 | Turner |
| 2019/0098113 A1 | 3/2019 | Park et al. |
| 2019/0102265 A1* | 4/2019 | Ngo .................. G06F 9/45558 |
| 2019/0109816 A1 | 4/2019 | Liu et al. |
| 2019/0114211 A1 | 4/2019 | Reddipalli et al. |
| 2019/0121889 A1 | 4/2019 | Gold et al. |
| 2019/0123959 A1 | 4/2019 | Joshi et al. |
| 2019/0141022 A1 | 5/2019 | Reeve et al. |
| 2019/0146773 A1 | 5/2019 | Attard |
| 2019/0158353 A1 | 5/2019 | Johnson et al. |
| 2019/0158600 A1 | 5/2019 | Cook |
| 2019/0182333 A1 | 6/2019 | Bartfai-Walcott et al. |
| 2019/0188742 A1 | 6/2019 | Vasudevan et al. |
| 2019/0190776 A1* | 6/2019 | Bregman ............ H04L 41/0869 |
| 2019/0213273 A1 | 7/2019 | Vasudevan et al. |
| 2019/0235978 A1 | 8/2019 | Wu et al. |
| 2019/0243836 A1 | 8/2019 | Nanda et al. |
| 2019/0251166 A1 | 8/2019 | Penrose et al. |
| 2019/0286353 A1 | 9/2019 | Soni et al. |
| 2019/0295012 A1 | 9/2019 | Marinescu et al. |
| 2019/0317869 A1 | 10/2019 | Selvaraj et al. |
| 2019/0319919 A1 | 10/2019 | Knecht et al. |
| 2019/0320038 A1* | 10/2019 | Walsh .................. H04L 65/65 |
| 2019/0324874 A1 | 10/2019 | Gill et al. |
| 2019/0342182 A1 | 11/2019 | Dhanabalan et al. |
| 2019/0384641 A1 | 12/2019 | Zhao et al. |
| 2020/0014607 A1 | 1/2020 | Gangaadhar et al. |
| 2020/0014633 A1 | 1/2020 | You et al. |
| 2020/0034776 A1 | 1/2020 | Peran et al. |
| 2020/0073739 A1 | 3/2020 | Rungta et al. |
| 2020/0092789 A1 | 3/2020 | Lee et al. |
| 2020/0097274 A1 | 3/2020 | Sarkar et al. |
| 2020/0104723 A1 | 4/2020 | Reissner et al. |
| 2020/0112487 A1 | 4/2020 | Inamdar et al. |
| 2020/0122038 A1 | 4/2020 | Ebrahimi et al. |
| 2020/0126129 A1 | 4/2020 | Lkhamsuren |
| 2020/0127832 A1 | 4/2020 | Ebrahimi |
| 2020/0150945 A1 | 5/2020 | Olderdissen et al. |
| 2020/0150946 A1 | 5/2020 | Olderdissen et al. |
| 2020/0177503 A1 | 6/2020 | Hooda et al. |
| 2020/0177630 A1 | 6/2020 | Penner et al. |
| 2020/0192690 A1* | 6/2020 | Gupta .................. H04L 67/34 |
| 2020/0218580 A1 | 7/2020 | Kim |
| 2020/0249973 A1 | 8/2020 | Ramesh et al. |
| 2020/0250002 A1 | 8/2020 | Gururaj et al. |
| 2020/0258627 A1 | 8/2020 | Setegn et al. |
| 2020/0274776 A1 | 8/2020 | Nishikawa |
| 2020/0287737 A1 | 9/2020 | Mishra et al. |
| 2020/0336467 A1 | 10/2020 | Subbarayan et al. |
| 2020/0356415 A1 | 11/2020 | Goli |
| 2021/0004270 A1 | 1/2021 | Singh et al. |
| 2021/0005330 A1 | 1/2021 | Patil et al. |
| 2021/0006636 A1 | 1/2021 | Koehler et al. |
| 2021/0042104 A1 | 2/2021 | Tashkandi |
| 2021/0042160 A1 | 2/2021 | Alamouti et al. |
| 2021/0044579 A1 | 2/2021 | Nelson-Gal et al. |
| 2021/0058338 A1 | 2/2021 | Liu |
| 2021/0067607 A1 | 3/2021 | Gardner et al. |
| 2021/0084670 A1 | 3/2021 | Chauhan et al. |
| 2021/0089408 A1* | 3/2021 | Park .................. G06F 16/9024 |
| 2021/0112059 A1 | 4/2021 | Heldman et al. |
| 2021/0112128 A1 | 4/2021 | Joshi et al. |
| 2021/0140815 A1 | 5/2021 | Pretorius et al. |
| 2021/0160338 A1 | 5/2021 | Koehler et al. |
| 2021/0232344 A1* | 7/2021 | Corrie .................. G06F 11/301 |
| 2021/0232469 A1 | 7/2021 | Gill |
| 2021/0255846 A1 | 8/2021 | Mamgain et al. |
| 2021/0271565 A1* | 9/2021 | Bhavanarushi ...... G06F 9/45558 |
| 2021/0311764 A1* | 10/2021 | Rosoff .................. G06F 9/5077 |
| 2021/0342193 A1 | 11/2021 | Anand |
| 2021/0373965 A1* | 12/2021 | Hadas ................ G06F 9/45558 |
| 2021/0400043 A1 | 12/2021 | Su et al. |
| 2022/0083018 A1 | 3/2022 | Majeed et al. |
| 2022/0083389 A1 | 3/2022 | Poothia et al. |
| 2022/0138070 A1 | 5/2022 | Mokashi et al. |
| 2022/0147336 A1 | 5/2022 | Joshi et al. |

(56) References Cited

U.S. PATENT DOCUMENTS

| | | |
|---|---|---|
| 2022/0279046 A1 | 9/2022 | Perng et al. |
| 2022/0334882 A1 | 10/2022 | Wang |
| 2023/0070811 A1 | 3/2023 | Patil et al. |
| 2023/0141808 A1 | 5/2023 | Joshi et al. |
| 2023/0289225 A1 | 9/2023 | Singh et al. |

FOREIGN PATENT DOCUMENTS

| | | |
|---|---|---|
| EP | 2831746 A1 | 2/2015 |
| WO | 9945465 A1 | 9/1999 |
| WO | 2014007811 A1 | 1/2014 |
| WO | 2016109743 A1 | 7/2016 |
| WO | 2016195841 A1 | 12/2016 |
| WO | 2020096639 A1 | 5/2020 |

OTHER PUBLICATIONS

"Architecting for the Cloud: AWS Best Practice", Amazon Web Services https://d1.awsstatic.com/whitepapers/AWS_Cloud_Best_Practices.pdf, Oct. 2018, pp. 1-50.

"Best Practices for Cloud Management", Service Now https://www.servicenow.com/content/dam/servicenow-assets/public/en-us/doc-type/resource-center/solution-brief/sb-cloud-management.pdf, Jun. 2017, pp. 1-2.

"Cisco Edge Intelligence At-a-Glance", Cisco https://www.cisco.com/c/en/us/solutions/collateral/internet-of-things/at-a-glance-c45-743263.html, Nov. 3, 2020, pp. 1-3.

"Cisco Edge Intelligence Data Sheet", Cisco https://www.cisco.com/c/en/us/solutions/collateral/internet-of-things/datasheet-c78-743838.html, Aug. 17, 2020, pp. 1-8.

"Hybrid Cloud with AWS", Aws https://d1.awsstatic.com/whitepapers/hybrid-cloud-with-aws.pdf, Nov. 2020, pp. 1-20.

"IBM Edge Application Manager", IBM https://www.ibm.com/cloud/edge-application-manager, May 5, 2020.

"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.

"MPRM: An Overview", ProSyst http://documentation.bosch-si.com/iot/PRM/v6.0/welcome/mprm_functional.html, Jun. 13, 2017, pp. 1-3.

"Multicloud Application Patterns", VMWare Docs https://docs.vmware.com/en/VMware-Tanzu-Service-Mesh/services/concepts-guide/GUID-4123C2ED-EC61-4CDA-A38D-2A7454BDDA46.html, Jul. 7, 2020, pp. 1-2.

"Setting up ServiceNow Cloud Management", DxSherpa https://dxsherpa.com/blogs/setting-up-servicenow-cloud-management/, Jul. 19, 2018, pp. 1-10.

"VIDEO—Intro to IBM Edge Application Manager", IBM https://www.ibm.com/cloud/blog/intro-to-ibm-edge-application-manager, May 13, 2020, pp. 1-16.

"Welcome to Azure Arc", YouTube, Microsoft Azure https://www.youtube.com/watch?v=3zdJJ97pNT4, Feb. 19, 2020, pp. 1.

"What is Anthos?", YouTube, Google Cloud Tech https://www.youtube.com/watch?v=Qtwt7QcW4J8, Apr. 21, 2020, pp. 1.

Carey, Scott, "The major hybrid cloud options compared: AWS Outposts vs Azure Stack vs Google Anthos", ComputerWorld https://www.computerworld.com/article/3428108/the-major-hybrid-cloud-options-compared-aws-outposts-vs-azure-stack-vs-google-anthos.html, Nov. 6, 2019, pp. 1-9.

Holzle, Urs, et al., "Introducing Anthos: An entirely new platform for managing applications in today's multi-cloud world", Google Cloud Blog https://cloud.google.com/blog/topics/hybrid-cloud/new-platform-for-managing-applications-in-todays-multi-cloud-world, Apr. 9, 2019, pp. 1-6.

Iyengar, Ashok, et al., "Clusters at the Edge", IBM https://www.ibm.com/cloud/blog/clusters-at-the-edge, Dec. 9, 2020, pp. 1-13.

Lewis, Sarah, "Cloudify", TechTarget https://www.techtarget.com/searchcloudcomputing/definition/Cloudify, Jun. 2019, pp. 1.

Manicka, Naveen, et al., "Simplify IoT Edge-to-Multi-Cloud Data Flow with Cisco Edge Intelligence", Cisco | Cisco Blogs https://blogs.cisco.com/developer/edge-intelligence-sandbox-lab, Aug. 6, 2020, pp. 1-7.

Marko, Kurt, "SAP to the fore as Cloud Foundry grows into the preferred platform for cloud-native enterprise apps", Diginomica https://diginomica.com/cloud-foundry-growing-preferred-platform-cloud-native-enterprise-applications, Jun. 19, 2017, pp. 1-10.

Mohamed, Riaz, "Deploy Cloud Agnostic Applications with VMware vRealize Automation Cloud", VMWare Cloud Management https://blogs.vmware.com/management/2019/09/cloud-agnostic-apps-vra-cloud.html, Sep. 17, 2019, pp. 1-10.

Morabito, Roberto, et al., "A Framework Based on SDN and Containers for Dynamic Service Chains on IoT Gateways", Proceedings of the Workshop on Hot Topics in Container Networking and Networked Systems. Ericsson Research, NomadicLab, Aug. 11, 2017, pp. 42-47.

Msv, Janakiram, "Google Forays Into Edge Computing With Cloud IoT Edge and TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.

Msv, Janakiram, "Why Azure Arc Is a Game Changer for Microsoft", Forbes https://www.forbes.com/sites/janakirammsv/2019/11/05/why-azure-arc-is-a-game-changer-for-microsoft/?sh=373f5c854307, Nov. 5, 2019, pp. 1-10.

Nolle, Tom, "Guide to Google Anthos architecture and management", TechTarget https://www.techtarget.com/searchcloudcomputing/tip/Guide-to-Google-Anthos-architecture-and-management, Aug. 27, 2020, pp. 1-7.

Poccia, Danilo, "New—AWS IoT Greengrass Adds Container Support and Management of Data Streams at the Edge", AWS | AWS News Blog https://aws.amazon.com/blogs/aws/new-aws-iot-greengrass-adds-docker-support-and-streams-management-at-the-edge/, Nov. 25, 2019, pp. 1-7.

Stakun, Jaroslaw, "Introduction to Red Hat OpenShift Container Platform", Open Virtualization Pro https://www.openvirtualization.pro/red-hat-openshift-container-platform/, Apr. 26, 2019, pp. 1.

Wiggers, Steef-Jan, "Google Cloud Platform Release Edge TPU and Cloud IoT Edge", InfoQ https://www.infoq.com/news/2018/07/google-iot-edge-tpu-ai/, Jul. 30, 2018, pp. 1-4.

U.S. Appl. No. 17/376,581 titled "Common Services Model for Multi-Cloud Platform" filed Jul. 15, 2021.

U.S. Appl. No. 16/522,567, titled "Apparatus and Method for Deploying a Machine Learning Inference as a Service at Edge Systems", dated Jul. 25, 2019, pp. all.

U.S. Appl. No. 16/666,242, titled "Scalable Centralized Internet-ofThings Manager", dated Oct. 28, 2019, pp. all.

U.S. Appl. No. 16/920,235, titled "Apparatus and Method for Deploying a Mobile Device as a Data Source in an IoT System", dated Jul. 2, 2020, pp. all.

U.S. Appl. No. 16/945,306, titled "Platform-as-a-Service Deployment Including Service Domains", dated Jul. 31, 2020, pp. all.

U.S. Appl. No. 17/148,231 titled "Upgrade Systems for Service Domains" filed Jan. 13, 2021, pp. all.

U.S. Appl. No. 17/187,220 titled "Generic Proxy Endpoints Using Protocol Tunnels Including Life Cycle Management and Examples for Distributed Cloud Native Services and Applications" filed Feb. 26, 2021, pp. all.

U.S. Appl. No. 17/302,189 titled "User Interface and Health Status Monitoring for a Multi Service Domainsystem" filed Apr. 27, 2021, pp. all.

U.S. Appl. No. 17/350,636 titled "AI Inference Hardware Resource Scheduling" filed Jun. 17, 2021, pp. all.

U.S. Appl. No. 16/522,567 titled "Machine Inference as a Service" filed Jul. 25, 2019, pp. all.

"BtrPlace: An Open-Source Flexible Virtual Machine Scheduler", University Nice Sophia Antipolis, pp. 1-8.

"Multi-Process Service", Nvidia, vR450, https://docs.nvidia.com/deploy/pdf/CUDA_Multi_Process_Service_Overview.pdf Jun. 2020, pp. 1-28.

"TensorFlow Serving", GitHub, https://github.com/tensorflow/serving pp. 1-4.

(56) References Cited

OTHER PUBLICATIONS

Abadi, Martin et al., "TensorFlow: Large-Scale Machine Learning on Heterogeneous Distributed Systems", Preliminary White Paper, http://download.tensorflow.org/paper/whitepaper2015.pdf Nov. 9, 2015, pp. 1-19.
Goldsborough, Peter et al. "A Tour of TensorFlow: Proseminar Data Mining", Technische Universität München, https://arxiv.org/pdf/1610.01178.pdf Oct. 2016, pp. 1-16.
Grammatikou, Mary et al., "GEMBus as a Service Oriented Platform for Cloud-Based Composable Services", 2011 IEEE Third International Conference on Cloud Computing Technology and Science, Nov. 1, 2011, pp. 666-671.
Hermann, Jeremy et al., "Meet Michelangelo: Uber's Machine Learning Platform", Uber Engineering, https://eng.uber.com/michelangelo-machine-learning-platform/ Sep. 5, 2017, pp. 1-17.
Hoare, Suchismita et al. "A Semantic-Agent Framework for PaaS Interoperability", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.
Jain, Paras et al., "Dynamic Space-Time Scheduling for GPU Inference", Massachusetts Institute of Technology, University of California, Berkeley; http://learningsys.org/nips18/assets/papers/102CameraReadySubmissionGPU_Virtualization%20(8).pdf 32nd Conference on Neural Information Processing Systems, Dec. 31, 2018, pp. 1-8.
Khaddar, Ajana El M. et al., "Smartphone: the Ultimate IoT and IoE Device", IntechOpen, "Smartphones from an Applied Research Perspective", pp. 137-162 (Ch. 7), Nov. 2, 2017, http://dx.doi.org/10.5772/intechopen.69734, pp. all.
Lacoste, M. et al., "User-Centric Security and Dependability in the Clouds-of-Clouds", IEEE Cloud Computing, Sep. 2016, 64-75.
Li, Li E. et al., "Scaling Machine Learning as a Service", Uber Technologies, Inc., JMLR: Workshop and Conference Proceeding, http://proceedings.mlr.press/v67/li17a/li17a.pdf 2016, pp. 16-29.
Mahajan, Kshiteej et al. "Themis: Fair and Efficient GPU Cluster Scheduling", Cornell University, ARXIV:1907.01484 [CS.DC], Published Oct. 29, 2019, 15 pages.
Muumbi, Rashid et al. "Learning Algorithms for Dynamic Resource Allocation in Virtualised Networks", Universitat Polit'ecnica de Catalunya, 08034 Barcelona, Spain, Publication date unknown, 4 pages.
Rafique, Ansar et al., "Towards Portability and Interoperability Support in Middleware for Hybrid Clouds", 2014 IEEE INFOCOM Workshop on Cross-Cloud Systems, Apr. 27, 2014, pp. 7-12.
Sun, Peng et al., "Towards Distributed Machine Learning in Shared Clusters: A Dynamically-Partitioned Approach", Cornell University: ARXIV: 1704.06738V1 [CS.CD], Published Apr. 22, 2017, 6 pages.
Warburton, Tim , "An Intro to GPU Architecture and Programming Models I Tim Warburton, Virginia Tech", YouTube, Argonne National Laboratory Training, https://www.youtube.com/watch?v=IGmPv8xoT4E Sep. 25, 2017, pp. 1-3.
"VMware Workspace One Access: Feature Walk-through", YouTube | https://www.youtube.com/watch?v=LGQRUe2vKWs, Feb. 19, 2020, pp. 1.
"vSphere With Tanzu—Networking with vSphere Distributed Switch.", YouTube | https://www.youtube.com/watch?v=0pl65Kn9AKk, Sep. 16, 2020, pp. 1.
Benson, Mark , "Technical Introduction to VMware Unified Access Gateway for Horizon Secure Remote Access", VMWare | https://blogs.vmware.com/euc/2015/09/what-is-vmware-unified-access-gateway-secure-remote-access.html, Sep. 9, 2015, pp. 8.
Colbert, Kit , "Announcing VMware vSphere with Tanzu: The Fastest Way to Get Started with Kubernetes", VMWare | https://blogs.vmware.com/vsphere/2020/09/announcing-vsphere-with-tanzu.html, Sep. 15, 2020, pp. 7.
Foley, Mike , "vSphere 7—Introduction to the vSphere Pod Service", VMWare | https://blogs.vmware.com/vsphere/2020/04/vsphere-7-vsphere-pod-service.html, Apr. 9, 2020, pp. 8.
Hagoort, Niels , "vSphere 7—A Closer Look at the VM DRS Score", VMWare | https://blogs.vmware.com/vsphere/2020/05/vsphere-7-a-closer-look-at-the-vm-drs-score.html, May 21, 2020, pp. 8.
Hagoort, Niels , "vSphere 7—Assignable Hardware", VMWare | https://blogs.vmware.com/vsphere/2020/03/vsphere-7-assignable-hardware.html, Mar. 31, 2020, pp. 7.
Hagoort, Niels , "vSphere 7—Improved DRS", VMWare | https://blogs.vmware.com/vsphere/2020/03/vsphere-7-improved-drs.html, Mar. 25, 2020, pp. 8.
Handy, Alex , "Using a Citrix ADC for the OpenShift Control Plane", Red Hat | https://cloud.redhat.com/blog/using-a-citrix-adc-for-the-openshift-control-plane, Oct. 6, 2020, pp. 5.
Iyengar, Ashok , "Analytics at the Edge", https://www.ibm.com/cloud/blog/analytics-at-the-edge, Jun. 8, 2020, pp. 1-13.
Iyengar, Ashok , "Architecting at the Edge", https://www.ibm.com/cloud/blog/architecting-at-the-edge, Oct. 21, 2019, pp. 1-14.
Iyengar, Ashok , et al., "Architectural Decisions at the Edge", https://www.ibm.com/cloud/blog/architectural-decisions-at-the-edge, Jul. 26, 2019, pp. 1-16.
Iyengar, Ashok , et al., "Automation at the Edge", https://www.ibm.com/cloud/blog/automation-at-the-edge, Feb. 18, 2017, pp. 1-13.
Iyengar, Ashok , "Cloud at the Edge", https://www.ibm.com/cloud/blog/cloud-at-the-edge, Feb. 26, 2019, pp. 1-9.
Iyengar, Ashok , "DevOps at the Edge", https://www.ibm.com/cloud/blog/devops-at-the-edge, Dec. 3, 2015, pp. 1-13.
Iyengar, Ashok , "GitOps at the Edge", https://www.ibm.com/cloud/blog/gitops-at-the-edge, Nov. 2, 2017, pp. 1-13.
Iyengar, Ashok , et al., "Models Deployed at the Edge", https://www.ibm.com/cloud/blog/models-deployed-at-the-edge, Mar. 30, 2020, pp. 1-17.
Iyengar, Ashok , "Policies at the Edge", https://www.ibm.com/cloud/blog/policies-at-the-edge, Jan. 22, 2020, pp. 1-13.
Iyengar, Ashok , et al., "Rounding Out the Edges", https://www.ibm.com/cloud/blog/rounding-out-the-edges, May 7, 2019, pp. 1-11.
Iyengar, Ashok , "Security at the Edge", https://www.ibm.com/cloud/blog/security-at-the-edge, May 12, 2020, pp. 1-17.
Lee, Brandon , "What is VMware vSphere 7 Assignable Hardware?", https://www.virtualizationhowto.com/2020/06/what-is-vmware-vsphere-7-assignable-hardware/, Jun. 25, 2020, pp. 8.
McConville, Anton , et al., "A brief history of Kubernetes, OpenShift, and IBM", IBM Developer Blog | https://developer.ibm.com/blogs/a-brief-history-of-red-hat-openshift/, Aug. 1, 2019, pp. 9.
Menezes, Alexandre , "Introduction to Security Contexts and SCCs", Red Hat | https://cloud.redhat.com/blog/introduction-to-security-contexts-and-sccs, Mar. 16, 2020, p. 7.
Paladi, Nicolae , et al., "Domain Based Storage Protection with Secure Access Control for the Cloud", https://dl.acm.org/doi/pdf/10.1145/2600075.2600082, 2014, pp. 35-42.
Rosoff, Jared , "Project Pacific—Technical Overview", VMWare | https://blogs.vmware.com/vsphere/2019/08/project-pacific-technical-overview.html, Aug. 26, 2019, pp. 7.
Sahu, Aditya , "The Fast Lane for Data Transfer—Paravirtual RDMA(PVRDMA) Support for Native Endpoints.", VMWare | https://blogs.vmware.com/vsphere/2020/10/para-virtual-rdma-support-for-native-endpoints.html, Oct. 15, 2020, pp. 7.
Tamura, Yoshi , "GPUs as a service with Kubernetes Engine are now generally available", Google Cloud | https://cloud.google.com/blog/products/gcp/gpus-service-kubernetes-engine-are-now-generally-available, Jun. 19, 2018, pp. 5.
West, Michael , "vSphere With Tanzu—Getting Started with vDS Networking Setup", VMWare | https://blogs.vmware.com/vsphere/2020/10/vsphere-with-tanzu-the-fastest-way-to-deliver-kubernetes-on-vsphere.html, Oct. 8, 2020, pp. 8.
Wiggers, Steef-Jan , "Google Kubernetes Engine 1.10 Is Generally Available and Enterprise Ready", InfoQ | https://www.infoq.com/news/2018/06/google-kubernetes-engine-1.10-ga, Jun. 1, 2018, pp. 4.

(56) References Cited

OTHER PUBLICATIONS

Beguelin, Daniel "Turn Your Smartphone Into an IoT Device", IBM Developer https://developer.IBM.com/tutorials/iot-mobile-phone-iot-device-bluemix-apps-trs/, Nov. 10, 2015, pp. 1-12.
"From Pilot to Production: Secure Workspace IoT Endpoint Management at Scale", VMWare, Inc. https://www.vmware.com/products/workspace-one/workspace-iot.html, pp. 1-3.
Stoks, Jessie , "Workspace IoT Series: How Industry 4.0 Will Transform Your Mobile Strategy", VMware End-User Computing Blog https://blogs.vmware.com/euc/2019/02/workspace-iot-mobile-strategy.html, Feb. 20, 2019, pp. 1-5.
Cano, Ignacio et al. "Curator: Self-Managing Storage for Enterprise Clusters"; University of Washington; published Mar. 2017; pp. all.
Poitras, Steven. "The Nutanix Bible" (Sep. 1, 2020), from https://nutanixbible.com/ pp. all.
Poitras, Steven. "The Nutanix Bible" (Sep. 17, 2019), from https:/nutanixbible.com/ pp. all.
Poitras, Steven "The Nutanix Bible" (Jul. 25, 2019), from https://nutanixbible.com/ pp. all.
Poitras, Steven. "The Nutanix Bible" (Mar. 2, 2020), from https://nutanixbible.com/ pp. all.
Poitras, Steven. "The Nutanix Bible" (Jan. 11, 2014), from http://stevenpoitras.com/the-nutanix-bible/ (Publication date based on indicated capture date by Archive.org; first publication date unknown), pp. all.
Poitras, Steven. "The Nutanix Bible" (Jan. 12, 2016), from https://nutanixbible.com/ pp. all.
Poitras, Steven. "The Nutanix Bible" (Oct. 15, 2013), from http://stevenpoitras.com/the-nutanix-bible/ (Publication date based on indicated capture date by Archive.org; first publication date unknown), pp. all.
Poitras, Steven. "The Nutanix Bible" (Jun. 20, 2014), from http://stevenpoitras.com/the-nutanix-bible/ (Publication date based on indicated capture date by Archive.org; first publication date unknown), pp. all.
Poitras, Steven. "The Nutanix Bible" (Jun. 25, 2018), from https://nutanixbible.com/ pp. all.
Poitras, Steven. "The Nutanix Bible" (Jan. 3, 2017), from https://nutanixbible.com/ pp. all.
Poitras, Steven. "The Nutanix Bible" (Jan. 3, 2018), from https://nutanixbible.com/ pp. all.
Poitras, Steven. "The Nutanix Bible" (Sep. 4, 2015), from https://nutanixbible.com/ pp. all.
Poitras, Steven. "The Nutanix Bible" (Jan. 7, 2015), from http://stevenpoitras.com/the-nutanix-bible/ (Publication date based on indicated capture date by Archive.org; first publication date unknown), pp. all.
Poitras, Steven. "The Nutanix Bible" (Jan. 8, 2019), from https://nutanixbible.com/ pp. all.
Poitras, Steven. "The Nutanix Bible" (Jun. 8, 2017), from https://nutanixbible.com/ pp. all.
Poitras, Steven. "The Nutanix Bible" (Jun. 9, 2015), from http://stevenpoitras.com/the-nutanix-bible/ (Publication date based on indicated capture date by Archive.org; first publication date unknown), pp. all.
Poitras, Steven, "The Nutanix Bible" (Jun. 9, 2016), from https://nutanixbible.com/ pp. all.
"Architecting VMware Unified Access Gateway", https://www.youtube.com/watch?v=URSdJ9qCQKo&t=234s, Apr. 17, 2019, pp. 1.
"AWS Architecture Monthly—Internet of Things Jun. 2019", AWS | https://d1.awsstatic.com/whitepapers/architecture-monthly/AWS-Architecture-Monthly-June-2019.pdf, Jun. 2019.
"AWS IoT Greengrass", https://web.archive.org/web/20190624094650/https:/aws.amazon.com/greengrass/, Jun. 2019, pp. 1-13.
"AWS IoT vs. Google IoT vs. Azure IoT", Bizety | https://www.bizety.com/2018/08/28/aws-iot-vs-google-iot-vs-azure-ot/, Aug. 28, 2018, pp. 1-7.
"Azure IoT Central intro walkthrough", https://www.youtube.com/watch?v=G32stXSwtyA&ab_channel=MicrosoftDeveloper, Feb. 2018.
"Cloud IoT Core", https://web.archive.org/web/20190129000453/https:/cloud.google.com/iot-core/, Jan. 2019, pp. 1-10.
"Cloud IoT Core—Devices, configuration, and state", Google | https://web.archive.org/web/20190330153113/https://cloud.google.com/iot/docs/concepts/devices, Mar. 2019.
"Cloud IoT Core Private Beta", Google | https://web.archive.org/web/20170518022234/https://cloud.google.com/iot-core/, May 2017.
"Comprehensive Guide on Upgrading PKS", PKS 1.3 https://kb.vmware.com/sfc/servlet.shepherd/version/download/068f4000009EfWPAAO, Apr. 2019, pp. 1-45.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-us/blog/extended-offline-operation-with-azure-iot-edge/, Sep. 2018.
"Extract, Transform, Load with AWS IoT Greengrass Solution Accelerator", AWS | https://aws.amazon.com/iot/solutions/etl-accelerator/, Oct. 2019, pp. 1-6.
"Google Cloud IoT Core", Google | https://www.slideshare.net/idof/google-cloud-iot-core, Sep. 2018.
"Introducing Google Cloud IoT Core: forsecurely connecting and managing IoTdevices at scale", Google Cloud | https://cloud.google.com/blog/products/gcp/introducing-google-cloud-iot-core-for-securely-connecting-and-managing-iot-devices-at-scale, May 2017.
"IoT Core device-to-device communication", Google |https://cloud.google.com/community/tutorials/iot-device-to-device, Dec. 2017.
"IoT Partner Quickstart", https://services.google.com/fh/files/misc/iot_partner_quickstart1.0.pdf, Nov. 15, 2018, pp. 1-13.
"Meeting at the Edge with VMware Internet of Things (IoT)", https://blogs.vmware.com/edge/files/2017/04/Meeting-at-the-Edge.pdf, Apr. 2017, pp. 1-9.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.
"Mobile Content Management", VMWare | https://www.vmware.com/content/dam/digitalmarketing/vmware/en/pdf/workspace-one/vmware-airwatch-mcm-datasheet.pdf, Dec. 2019, pp. 1-4.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"What is AWS IoT?", AWS | Youtube: https://www.youtube.com/watch?v=WAp6FHbhYCk&ab_channel=AmazonWebServices; Timestamp 4:55/10:08, Jan. 2018.
"What is IoT Edge?", Code Project | https://www.codeproject.com/Articles/1261285/What-is-IoT-Edge, Sep. 2018, pp. 1-9.
Avram, Abel , "AWS Greengrass Runs Lambda Functions on IoT Devices", InfoQ | https://www.infoq.com/news/2017/06/aws-greengrass/, Jun. 8, 2017, pp. 1-2.
Banka, Roank , "Pivotal CloudFoundry on Google cloud platform", Slideshare https://www.slideshare.net/RonakBanka/pcfgcpgoogleioextended, Jul. 16, 2018, pp. 1-44.
Chi, Chrissie , "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.
Lobo, Savia , "Microsoft Azure IoT Edge is open source and generally available!", PacktHub | https://hub.packtpub.com/microsoft-azure-iot-edge-is-open-source-and-generally-available/, Jun. 29, 2018, pp. 1-2.
Msv, Janakiram , "5 Reasons Why Azure IoT Edge Is Industry's Most Promising Edge Computing Platform", Forbes https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.

(56) References Cited

OTHER PUBLICATIONS

Msv, Janakiram, "Azure IoT Edge: A Technology Primer", TheNewsStack | https://thenewstack.io/azure-iot-edge-a-technology-primer/, Sep. 14, 2018, pp. 1-9.
Oleniczak, Kevin, "Using AWS IoT for Predictive Maintenance", AWS | https://aws.amazon.com/blogs/iot/using-aws-iot-for-predictive-maintenance/, Jun. 28, 2018, pp. 1-6.
Param, Sunil, "Google's Coral: A new product development platform with local AI", TechGig | https://content.techgig.com/technology/googles-coral-a-new-product-development-platform-with-local-ai/articleshow/69042955.cms, Apr. 26, 2019, pp. 1-18.
Rhee, Injong, "Bringing intelligence to the edge with Cloud IoT", Google Cloud | https://cloud.google.com/blog/products/gcp/bringing-intelligence-edge-cloud-iot, Jul. 25, 2018, pp. 1-7.
Vanderzyden, John, "Using AWS Greengrass to Enable IoT Edge Computing", mabl | https://www.mabl.com/blog/using-aws-greengrass-enable-iot-edge-computing, Aug. 23, 2017, pp. 1-12.
Wiggers, Kyle, "Microsoft launches Azure IoT Edge out of preview", VentureBeat | https://venturebeat.com/mobile/microsoft-launches-azure-iot-edge-out-of-preview/, Jun. 27, 2018, pp. 1-6.
Yamashita, Teppei, "Real-time data processing with IoT Core", Google Cloud | https://cloud.google.com/community/tutorials/cloud-iot-rtdp, Apr. 2018, pp. 1-19.
Zhang, Xinyi, "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.
"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, pp. 1-2.
"Comprehensive Guide on Upgrading PKS", PKS 1.3, Apr. 2019, pp. 1-45.
"Enabling Monitoring for User-defined Projects", https://docs.openshift.com/container-platform/4.6/monitoring/enabling-monitoring-for-user-defined-projects.html retrieved May 24, 2022 relevant to OpenShift Container Platform 4.6 general avaibility Oct. 27, 2020, pp. 1-13.
"How to adopt a multi-cluster strategy for your applications in Anthos", YouTube | Google Cloud Tech https://www.youtube.com/watch?v=ZhF-rTXq-Us&list=PLlivdWyY5sqKN73vzKpg2p2JmOGoAN0CG&index=6, May 29, 2020, pp. 1.
"How to get started with Anthos on Google Cloud", YouTube | Google Cloud Tech https://www.youtube.com/watch?v=ghFiaz7juoA&list=PLlivdWyY5sqKN73vzKpg2p2JmOGoAN0CG&index=4, Apr. 30, 2020, pp. 1.
"How to Troubleshoot PKS Upgrade Issues", VMware Tanzu Supprt Hub https://community.pivotal.io/s/article/how-to-troubleshoot-pks-upgrade-issues?language=en_US, Jul. 17, 2019, pp. 1-11.
"Installation and Update OpenShift Container Platform Installation Overview", https://docs.openshift.com/container-platform/4.5/architecture/architecture-installation.html retrieved May 24 relevant to OpenShift Container Platform 4.5 general availability Jul. 13, 2020, pp. 1-17.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Managing Metrics", https://docs.openshift.com/container-platform/4.6/monitoring/managing-metrics.html#/managing-metrics retrieved May 24, 2022 relevant to OpenShift Container Platform 4.6 general availability Oct. 27, 2020, pp. 1-14.
"Migrating Kubernetes apps to Serverless with Cloud Run on Anthos", YouTube | Google Cloud Tech https://www.youtube.com/watch?v=0T5UliS9j8A, Nov. 19, 2019, pp. 1
"Monitoring Project and Application Metrics Using the Developer Perspective", https://docs.openshift.com/container-platform/4.9/applications/odc-monitoring-project-and-application-metrics-using-developer-perspective.html#monitoring-project-and-application-metrics-using-developer-perspective retrieved May 24, 2022 relevant to, OpenShift 4.9 general availability Oct. 18, 2020, pp. 1-7.
"New Technology Projection: The Total Economic Impact of Anthos", A Forrester Total Economic Impact https://services.google.com/fh/files/misc/the_total_economic_impact_of_anthos.pdf?mkt_tok=ODA4LUdKVy0zMTQAAAGEowKcUaDaTyTRyP0murezYOwrjB4GihzmPwbs7d0qMaMhJZtax3Of12Gx2-HRDm4SifQME2gL7297yUgZ3FEMxg5UdUp3eFaN5j_Oie7D0ta28s, Nov. 2019, pp. 1-26.
"Observing Environments", https://access.redhat.com/documentation/en-us/red_hat_advanced_cluster_management_for_kubernetes/2.1/html-single/observing_environments/index retrieved May 24, 2022 relevant to Red Hat Advanced Cluster Management for Kubernetes 2.1, general availability Nov. 5, 2020, pp. 1-16.
"OpenShift Container Platform Architecture", https://docs.openshift.com/container-platform/4.5/architecture/architecture.html retrieved May 24, 2022 relevant to OpenShift Container Platform 4.5 general availability Jul. 13, 2020, pp. 1-10.
"OpenShift Container Platform Architecture", https://docs.openshift.com/container-platform/4.1/architecture/architecture.html retrieved May 27, 2022 relevant to OpenShift Container Platform 4.1 general availability Jun. 4, 2019, pp. 1-11.
"OpenShift Container Platform cluster monitoring, logging, and Telemetry", RedHat https://access.redhat.com/documentation/en-us/openshift_container_platform/4.2/html/container-native-virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27 relevant to OpenShift Container Platform 4.1 general availability Jun. 4, 2019, pp. 1-13.
"Overview: OpenShift Container Platform", https://docs.openshift.com/container-platform/3.9/getting_started/index.html retrieved May 24 relevant to OpenShift Container Platform 3.9 general availability Oct. 2018, pp. 1-2.
"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, pp. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Pivotal Container Service (PKS)", Pivotal Version 1.2 https://resources.docs.pivotal.io/pdfs/pks-1-2.pdf, Sep. 3, 2019, pp. 1-323.
"Pivotal Container Service Overview", Slideshare https://www.slideshare.net/Pivotal/pivotal-container-service-overview, Jul. 16, 2019, pp. 1-78.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Red Hat Enterprise Linux CoreOS (RHCOS)", https://docs.openshift.com/container-platform/4.5/architecture/architecture-rhcos.html retrieved May 24, 2022 relevant to OpenShift Container Platform 4.5 general availability Jul. 13, 2020, pp. 1-19.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.

(56) References Cited

OTHER PUBLICATIONS com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.5/architecture/understanding-development.html retrieved May 24, 2022 relevant to OpenShift Container Platform 4.5 general availability Jul. 13, 2020, pp. 1-17.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"VMware Announces VMware Tanzu Portfolio to Transform the Way Enterprises Build, Run and Manage Software on Kubernetes", VMware News & Stories https://news.vmware.com/releases/vmware-announces-vmware-tanzu-portfolio-to-transform-the-way-enterprises-build-run-and-manage-software-on-kubernetes, Aug. 26, 2019, pp. 1-11.
"VMware Enterprise PKS Architecture Overview", YouTube https://www.youtube.com/watch?v=504FGHukY8Y, Feb. 9, 2018, pp. 1.
"VMware Tanzu Mission Control Demo", YouTube https://www.youtube.com/watch?v=7m9S4HilJlo, Aug. 28, 2019, pp. 1.
"What is Anthos Service Mesh?", Google Cloud | Anthos Service Mesh 1.4 https://cloud.google.com/service-mesh/v1.4/docs/overview, Dec. 20, 2019, pp. 1-4.
Balkan, Ahmet Alp, "What's new in Cloud Run for Anthos", Google Cloud https://cloud.google.com/blog/products/serverless/new-features-in-cloud-run-for-anthos-ga, Dec. 11, 2019, pp. 1-7.
Banka, Roank, "Pivotal CloudFoundry on Google cloud platform", Slideshare https://www.slideshare.net/Pivotal/pivotal-container-service-overview, Jul. 16, 2018, pp. 1-44.
Ben-David, Jacob, "Google Cloud's Anthos—Everything You Need To Know", Turbonomic Blog https://blog.turbonomic.com/google-clouds-anthos, Apr. 15, 2019, pp. 1-9.
Goodison, Donna, "Google Cloud Unleashes Managed Service Mesh, Serverless for Anthos", The Channel Co. CRN https://www.crn.com/news/cloud/google-cloud-unleashes-managed-service-mesh-serverless-for-anthos, Sep. 16, 2019, pp. 1-6.
Holzle, Urs, et al., "Introducing Anthos: An entirely new platform for managing applications in today's multi-cloud world", Google Cloud https://cloud.google.com/blog/topics/hybrid-cloud/new-platform-for-managing-applications-in-todays-multi-cloud-world, Apr. 9, 2019, pp. 1-7.
Islam, Tariq, et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
Lin, Jennifer, et al., "Anthos simplifies application modernization with managed service mesh and serverless for your hybrid cloud", Google Cloud https://cloud.google.com/blog/topics/hybrid-cloud/anthos-simplifies-application-modernization-with-managed-service-mesh-and-serverless-for-your-hybrid cloud, Sep. 16, 2019, pp. 1-6.
Malasi, Aman, "Google Anthos: Write Once, Run Anywhere", HCL Tech Blogs https://www.hcltech.com/blogs/google-anthos-write-once-run-anywhere, Aug. 26, 2019, pp. 1-2.
McLuckie, Craig, "Introducing VMware Tanzu Mission Control to Bring Order to Cluster Chaos", VMware Tanzu https://tanzu.vmware.com/content/blog/introducing-vmware-tanzu-mission-control-to-bring-order-to-cluster-chaos, Aug. 26, 2019, pp. 1-6.
O'Keefe, Megan, "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.
Reid, Nate, "Upgrading VMware Enterprise PKS 1.2 to 1.3", YouTube https://www.youtube.com/watch?v=7pAxNWIxVLM, Jan. 28, 2019, pp. 1.
Schonbaum, Iftach, "Anthos—Google's Enterprise Hybrid & Multi-Cloud Platform", CloudZone https://medium.com/cloudzone/anthos-googles-enterprise-hybrid-multi-cloud-platform-7975e05a7729, Apr. 23, 2019, pp. 1-7.
[Published as US-2023-0070811-A1] U.S. Appl. No. 17/932,235 titled "Apparatus and Method for Depoying a Mobile Device as a Data Source in an IoT System" filed Sep. 14, 2022.
[Published as US-2023-0141808-A1] U.S. Appl. No. 18/047,623 titled "Common Services Model for Multi-Cloud Platform" filed Oct. 18, 2022.
U.S. Appl. No. 18/185,300 titled "Scalable Centralized Manager Including Examples of Data Pipeline Deployment to an Edge System" filed Mar. 26, 2023.
U.S. Appl. No. 18/321,678 titled "Generic Proxy Endpoints Using Protocol Tunnels Including Life Cyclemanagement and Examples for Distributed Cloud Native Services Andapplications" filed May 22, 2023.
"Cloud, Fog and Edge Computing—What's the Difference?", https://www.winsystems.com/cloud-fog-and-edge-computing-whats-the-difference/, Dec. 4, 2017, pp. 1-10.
"IoT: Understanding the shift from cloud to edge computing", https://internetofbusiness.com/shift-from-cloud-to-edge-computing/, Aug. 14, 2018, pp. 1-9.
Angelas, "Java Heap Space vs. Stack Memory: How Java Applications Allocate Memory", stackify.com, Sep. 5, 2017, pp. 1-3.
"Neo-AI-DLR is a common runtime for machine learning models compiled by AWS SageMaker Neo, TVM, or TreeLite.", GitHub | https://github.com/neo-ai/neo-ai-dlr, Dec. 1, 2020, pp. 1-4.
"Unified Access Gateway Architecture", https://techzone.vmware.com/resource/unified-access-gateway-architecture, Nov. 2020, pp. 1-18.
AI, Yuan, et al., "Edge computing technologies for Internet of Things: a primer", Digital Communications and Networks 4 | https://doi.org/10.1016/j.dcan.2017.07.001, 2018, pp. 77-86.
Beltre, Angel, et al., "Enabling HPC workloads on Cloud Infrastructure using Kubernetes Container Orchestration Mechanisms", 2019 IEEE/ACM Workshop on Containers and New Orchestration Paradigms for Isolated Environments In HPC (CANOPIEHPC), 2019, pp. 11-20.
Harnik, Danny, et al., "Secure Access Mechanism for Cloud Storage", vol. 12, No. 3, pp. 317-336. [Retrieved from internet on Feb. 14, 2023], <https://scpe.org/index.php/scpe/article/view/727>, 2011, pp. 317-336.
Iyengar, Ashok, et al., "5G at the Edge", https://www.IBM.com/cloud/blog/5g-at-the-edge, Nov. 12, 2020, pp. 1-13.
O'Keefe, Megan, "Edge Computing and the Cloud-Native Ecosystem", TheNewStack | https://thenewstack.io/edge-computing-and-the-cloud-native-ecosystem/, Apr. 18, 2018, pp. 1-11.
Ren, Ju, et al., "Edge Computing for the Internet of Things", IEEE Journals & Magazine | vol. 32 Issue: 1, 2008, pp. 1-6.
Warke, Amit, et al., "Storage Service Orchestration with Container Elasticity", 2018 IEEE 4th International Conference on Collaboration and Internet Computing DOI 10.1109/CIC.2018.00046, 2018, pp. 283-292.
Zhao, Zhuoran, et al., "DeepThings: Distributed Adaptive Deep Learning Inference on Resource-Constrained IoT Edge Clusters", IEEE Transactions on Computer-Aided Design of Integrated Circuits and Systems, vol. 37, No. 11 | doi: 10.1109/TCAD.2018.2858384., Nov. 2018, pp. 2348-2359.
Poitras, Steven, "The Nutanix Bible", https://nutanixbible.com/, Apr. 9, 2019, pp. all.
"API Quick Reference", https://web.archive.org/web/20201021193437/https:/docs.vmware.com/en/VMware-Tanzu-Service-Mesh/services/api-programming-guide/GUID-6C5044B8-6950-42A6-87A5-3D88BEAE09DB.html, Oct. 2020, pp. 5.
"Backup & Secure", USGS, 2018.

(56) References Cited

OTHER PUBLICATIONS

"Cascade Mode Deployment", https://docs.vmware.com/en/Unified-Access-Gateway/3.10/com.vmware.uag-310-deploy-config.doc/GUID-AWT-DEPLOYMENT-CASCADE.html#GUID-AWT-DEPLOYMENT-CASCADE, Jul. 2, 2019, pp. 2.
"Mobile Content Management—Datasheet", https://www.vmware.com/content/dam/digitalmarketing/vmware/en/pdf/workspace-one/vmware-airwatch-mcm-datasheet.pdf, Mar. 12, 2019, pp. 4.
"Runtime System", Wikipedia, 2018.
"Tunnel Architecture", https://techzone.vmware.com/resource/workspace-one-uem-architecture#tunnel-architecture, Nov. 2020, p. 34.
"Unified App Catalog", https://techzone.vmware.com/resource/workspace-one-uem-architecture#unified-app-catalog, Nov. 2020, p. 21.
"Using the Workspace ONE UEM REST API to Extend Device Compliance Parameters", https://techzone.vmware.com/resource/workspace-one-uem-architecture#using-the-workspace-one-uem-rest-api-to-extend-device-compliance-parameters, Nov. 2020, p. 23.
"VMware Identity Manager API", https://developer.vmware.com/apis/57/#api, Aug. 2018, pp. 2.
"VMware Tanzu Service Mesh built on VMware NSX", VMware | https://www.vmware.com/content/dam/digitalmarketing/vmware/en/pdf/docs/vmw-tanzu-service-mesh-solution-brief.pdf, Mar. 2020, pp. 3.
"VMware Tanzu Service Mesh Documentation", VMware Tanzu Service Mesh | https://docs.vmware.com/en/VMware-Tanzu-Service-Mesh/index.html, Aug. 2020, pp. 2.
"VMware Tunnel", https://techzone.vmware.com/resource/workspace-one-uem-architecture#vmware-tunnel, Nov. 2020, p. 34.
"VMware Tunnel (Per-App VPN) Connections in Cascade Mode", https://docs.vmware.com/en/Unified-Access-Gateway/3.10/com.vmware.uag-310-deploy-config.doc/GUID-B69DD1E7-ED88-4574-912C-DBA071BC9D6F.html, May 31, 2019, pp. 2.
"VMware Unified Access Gateway: Use Cases—Feature Walkthrough", https://www.youtube.com/watch?v=xaN9mYOJqAs, Oct. 27, 2017, pp. 1.
"Workspace ONE UEM 1810 introduces support for Android Enterprise fully managed devices with work profiles", https://bayton.org/blog/2018/10/workspace-one-uem-1810-introduces-support-for-android-enterprise-fully-managed-devices-with-work-profiles/, Oct. 29, 2018, pp. 11.
Bayton, Jason , "Android Enterprise COPE enrolment comparison: WS1 UEM / MI Core", https://www.youtube.com/watch?v=QSJu3xFzjMw, Oct. 28, 2018, pp. 1.
Coronado, Jose , "Deploying Tanzu Application Service for Kubernetes on Kind", VMware Tanzu | https://vxcoronado.net/index.php/2020/05/31/deploying-tanzu-application-service-for-kubernetes-on-kind/, May 31, 2020, pp. 8.
Rajiv, Srivastava , "Install Tanzu Build Service (TBS v1.0 GA) on Kubernetes—build docker image and store in DockerHub image registr", https://cloudificationzone.com/2020/08/24/build-docker-image-using-tanzu-build-service-on-kubernetes-using-dockerhub/, Aug. 24, 2020, pp. 10.
Schweighhardt, Mark , "VMware Tanzu Service Mesh, built on VMware NSX is Now Available!", VMware | https://blogs.vmware.com/networkvirtualization/2020/03/vmware-tanzu-service-mesh-built-on-vmware-nsx-is-now-available.html/, Mar. 10, 2020, pp. 8.
U.S. Appl. No. 18/151,350 titled "Dynamic Allocation of Compute Resources at a Recovery Site" filed Jan. 6, 2023.
U.S. Appl. No. 15/956,036, titled "Dynamic Allocation of Compute Resources at a Recovery Site", filed Apr. 18, 2018, pp. all.
U.S. Appl. No. 16/191,377 titied "System and Method for the Dynamic Expansion of a Cluster With Co Nodes Before Upgrade", filed Nov. 14, 2018; pp. all.
Disaster Recovery: Ensuring High Availability for Mission-Critical Applications, VMware ,2015 , pp. 1-4.
Dynamically Allocated Virtual Clustering Management System User's Guide, United States Army Research Laboratory www.arl.army.mil.www/default.cfm?page=2488 [retrieved Oct. 17, 2017], Retrieved from Internet Archive; pp. all Jun. 5, 2020, pp. all.
Denneman,Frank et al., VMware Cloud on AWS—A Closer Look, VMware vSphere Blog; https://blog.vmware.com/vsphere/2016/10/vmware-cloud-on-aws-a-closer-look.html , Oct. 13, 2016 , pp. 1-6.
Denneman,Frank et al., VMWare Cloud on AWS—Elastic DRS Preview, https://frankdenneman.nl/2016/10/18/vmware-cloud-aws-elastic-drs/ , Oct. 18, 2016 , pp. 1-4.
Epping,D. et al., Scale Up/Out and impact of vRAM?!? (part 2), Yellow-Bricks.com [online], 2011 [retrieved May 9, 2020], Retrieved from internet: https://www.yellow-bricks.com/2011/07/21/scale-upout-and-impact-of-vram-part-2, May 9, 2020, pp. 1-6.
Hodroj,Ali et al., Disaster Recovery on Demand, Cloudify | https://cloudify.co/blog/cloudifying-high-availability-part-2-disaster-recovery-on-demand/ , Sep. 16, 2013 , pp. 1-9.
Miller,T. et al.,The Disaster Recovery Reality Check, https://www.cohesity.com/blogs/the-disaster-recovery-reality-check/, COHESITY, ,May 21, 2020 , pp. 1-3.
U.S. Appl. No. 18/930,885 titled "Platform-As-A-Service Deployment Including Service Domains" filed Oct. 29, 2024.
"Google IoT Platform: Awesome Tools for Any Project", https://indeema.com/blog/google-cloud, Feb. 20, 2019, pp. 1-9.
"Microsoft Azure IoT Reference Architecture", https://download.microsoft.com/download/A/4/D/A4DAD253-BC21-41D3-B9D9-87D2AE6F0719/Microsoft_Azure_IoT_Reference_Architecture.pdf, Sep. 26, 2018, pp. 18.
"Setup Azure IoT Edge CI/CD Pipeline with ARM Agent", https://devblogs.microsoft.com/iotdev/setup-azure-iot-edge-ci-cd-pipeline-with-arm-agent/, Nov. 13, 2018, pp. 1-11.
"The Developer's Guide to Azure", https://download.microsoft.com/download/2/C/F/2CF7401A-B9D7-4828-917D-199E0896BFE5/Azure_Developer_Guide_eBook.pdf, May 2019, pp. 64.
Asanghanwa, Eustace , "Simplifying confidential computing: Azure IoT Edge security with enclaves—Public preview", https://azure.microsoft.com/en-us/blog/simplifying-confidential-computing-azure-iot-edge-security-with-enclaves-public-preview/, Nov. 19, 2018, pp. 1-7.
Barr, Jeff , "AWS Greengrass—Run AWS Lambda Functions on Connected Devices", https://aws.amazon.com/blogs/aws/category/aws-greengrass/, Jun. 7, 2017, pp. 1-18.
Berdy, Nicole , "Azure IoT Hub message routing dramatically simplifies IoT solution development", https://azure.microsoft.com/en-us/blog/azure-iot-hub-message-routing-enhances-device-telemetry-and-optimizes-iot-infrastructure-resources/, Dec. 14, 2016.
Decarlo, Paul , "Using Cognitive Services Containers with Azure IoT Edge", https://dev.to/azure/using-cognitive-services-containers-with-azure-iot-edge-1e5a, May 18, 2019, pp. 1-15.
Garcin-Beldowski, Sébastien , "AWS Greengrass the forefront of edge computing", https://medium.com/smileinnovation/aws-greengrass-the-forefront-of-edge-computing-8ec2098a33b7, Dec. 14, 2018, pp. 1-18.
George, Sam , "Azure IoT Edge generally available for enterprise-grade, scaled deployments", https://azure.microsoft.com/en-us/blog/azure-iot-edge-generally-available-for-enterprise-grade-scaled-deployments/, Jun. 27, 2018, pp. 1-5.
Lawton, George , "With AWS Greengrass, IoT apps become seamless edge to cloud", https://www.techtarget.com/iotagenda/feature/With-AWS-Greengrass-IoT-apps-become-seamless-edge-to-cloud, Jul. 16, 2018, pp. 1-7.
Liu, Gus , "How to Install a Face Recognition Model at the Edge with AWS IoT Greengrass", https://aws.amazon.com/blogs/iot/how-to-install-a-face-recognition-model-at-the-edge-with-aws-iot-greengrass/, Apr. 30, 2019, pp. 1-10.
Rai, Rahul , "Building Applications with Azure IoT Edge", https://thecloudblog.net/post/building-applications-with-azure-iot-edge/, Apr. 25, 2018, pp. 1-16.
Rai, Rahul , "IoT Edge Device Monitoring and Management with Azure Durable Entities Functions—Part 1", https://thecloudblog.net/post/iot-edge-device-monitoring-and-management-with-azure-durable-entities-functions-part-1/, Jul. 1, 2019, pp. 1-14.

\* cited by examiner

KEY VALUE STORE IN A CLUSTERED CONTAINERIZED SYSTEM

CROSS-REFERENCE TO RELATED APPLICATIONS

This application claims the benefit of the earlier filing date of U.S. Provisional Application 63/094,733, filed Oct. 21, 2020, which application is hereby incorporated by reference in its entirety for any purpose.

TECHNICAL FIELD

Examples described herein relate to distributed software systems. Examples of cluster orchestration services that store key values with a higher software layer, such as a container orchestration service are described.

BACKGROUND

Distributed computing systems generally include multiple computing nodes which cooperate together to provide computing services. Frequently, multiple computing nodes may each run instances of a particular service—and the instances of the service cooperate together to perform the service as a whole.

Distributed systems may pose a variety of complexities. Coordination may be needed between the computing nodes to ensure services are accurately performed and that the system as a whole is resilient to failure of one or more of the computing nodes.

Moreover, software stacks may be utilized on computing nodes, including on computing nodes of distributed systems. Each layer of the software stack may perform designated functions, and may interact with other layers in the stack to provide inputs to a next layer, or receive outputs from a previous layer. In this manner, the layers may be somewhat modular.

Coordinating the interaction between layers of a software stack or services on a node as needed may accordingly be complex but important to ensuring efficient, accurate, and reliable operation of a distributed system.

DETAILED DESCRIPTION

Figure 1:
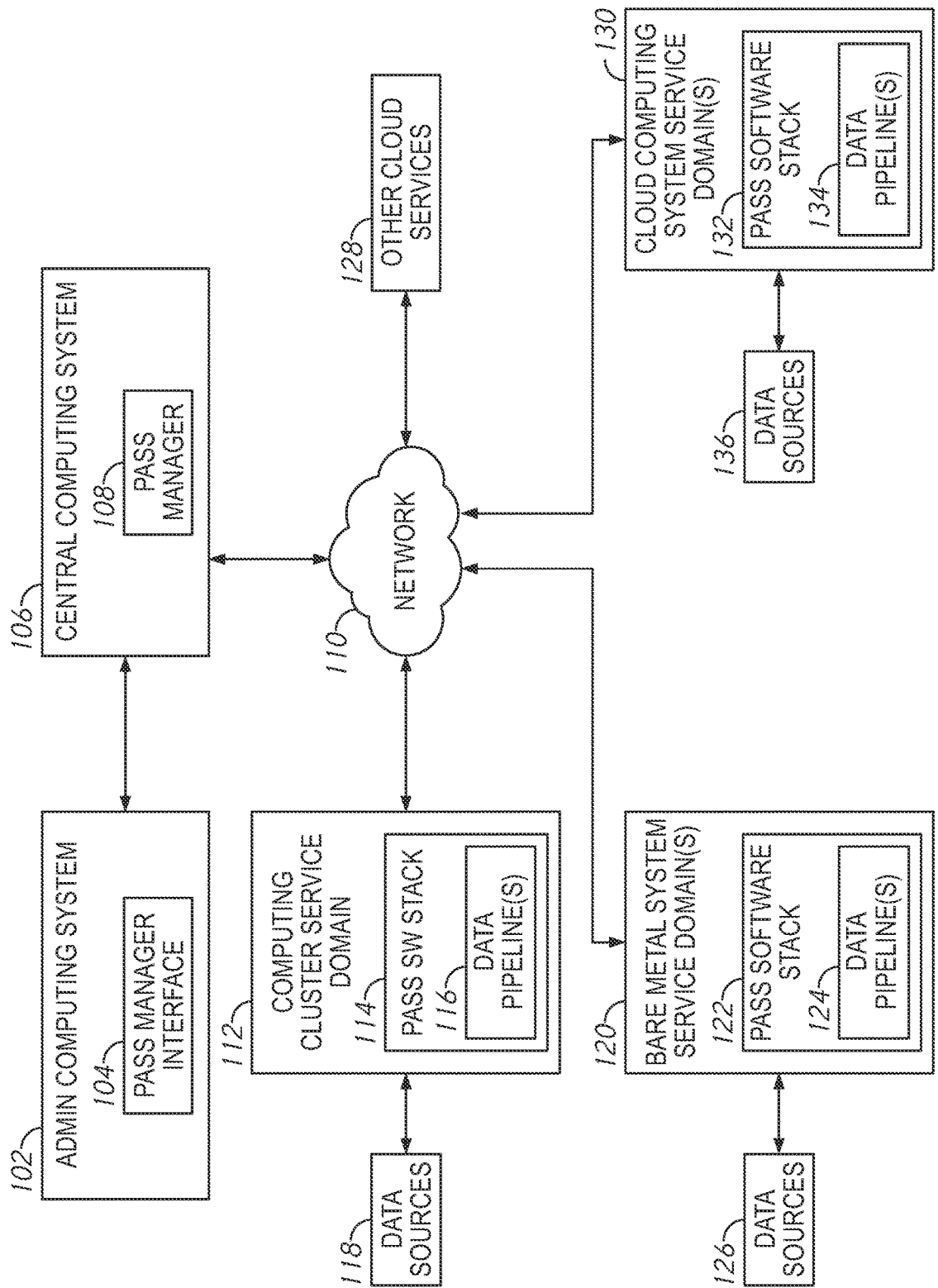
FIG. 1 is a block diagram of a multi-cloud platform as a service system, in accordance with an embodiment of the present disclosure.

Examples described herein relate to containerized clustered computing systems which may be used to provide a platform as a service (PaaS) environment. Examples of clustered computing systems described herein may manage metadata used to administer the cluster in a manner which improves the reliability and efficiency of cluster operations in some examples. In particular, key values (e.g., metadata) used by cluster orchestrators to manage computing node clusters may be stored in a different (e.g., higher) software layer than that of the cluster orchestrator. For example, a container orchestrator (e.g., Kubernetes) may be used to store and manage the storage of key values used to manage a cluster of computing nodes. The use of a higher software layer to manage this key value storage may provide a higher availability of the key value stores and greater resiliency to node failure.

A cluster orchestrator may be used to manage a cluster of computing nodes. A container orchestrator may be used to manage containers used on one or more of the computing nodes. The container orchestrator may be provided in a different software layer, a higher software layer, than the cluster orchestrator. The clustered system may be configured (e.g., setup or installed) by initiating a bootstrap node including a first cluster infrastructure orchestrator and first container orchestrator. Cluster metadata may be migrated (e.g., copied) to a key value store of the first container orchestrator (e.g., managed by the first container orchestrator). A second node in the cluster may be configured (e.g., setup or installed) by configuring a second cluster infrastructure orchestrator of the second node with a dependency on the first container orchestrator of the bootstrap node. The dependency may be created, for example, because the cluster infrastructure orchestrator may utilize metadata (which may be referred to as cluster metadata) stored by the container orchestrator in order to complete setup (e.g., for the second computing node to join the cluster).

Multi-cloud platform as a service systems (PaaS) may utilize computing clusters, including computing clusters utilizing containerized systems. Configuration, updates, and other tasks associated with such computing clusters may be complicated by installation of both cluster infrastructure orchestrators and container orchestrators at each node of the cluster. For example, where the cluster infrastructure orchestrator is located below a container orchestrator, configuration or upgrade of new nodes in the cluster may involve storing a key value store used by the cluster infrastructure orchestrator on each computing node at the cluster infrastructure orchestrator layer. Repeating the task of creating the key value store may increase complexity of cluster configuration and increase complexity of recovery of the cluster in case of node failure. For example, where a node of the cluster is rebooted, reconfigured, updated, or newly added to the cluster, a key value store is newly added to the cluster infrastructure orchestrator of the node and the key value store is updated at each of the cluster nodes. It may be cumbersome to manage this key value storage across the cluster.

Creating the key value store at a container orchestrator layer of a node of the cluster may reduce complexity of configuration, upgrades, and failure recovery of the cluster. The container orchestrator may, for example, provide resilient storage of data such that high availability of the key value store may be achieved across the cluster. In some examples, during initialization of a bootstrap node, a key value store may be moved from the cluster infrastructure orchestrator to the container orchestrator (which may include simply storing the key value store in the container orchestrator initially). As new nodes are initialized and added to the cluster, cluster infrastructure orchestrators on subsequent nodes may be configured with a dependency on the container orchestrator of the bootstrap node, such that instead of creating a key value store at each node, the cluster infrastructure orchestrators may reference (e.g., access) the key value store created at the bootstrap node. During rebooting of a node, expansion of the cluster, upgrades, or other tasks which may include accessing and/or updating the cluster key value store, complexity may be reduced by the ability to update a shared cluster key value store, improving operation and user experience for services provided using containerized computing clusters.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessarily mutually exclusive, as some disclosed embodiments can be combined with one or more other disclosed embodiments to form new embodiments.

FIG. 1 is a block diagram of a multi-cloud platform as a service system 100, in accordance with an embodiment of the present disclosure. The system may include one or more of any of computing cluster service domains 112 coupled to respective data sources 118, bare metal system service domain(s) 120 coupled to respective data sources 126, and cloud computing system service domain(s) 130 coupled to respective data sources 136. The system may further include a central computing system 106 coupled to one or more of the computing cluster service domains 112, bare metal system service domain(s) 120, and/or cloud computing system service domain(s) 130 via a network 110 to manage communication within the system.

The network 110 may include any type of network capable of routing data transmissions from one network device (e.g., of the computing cluster service domains 112, the bare metal system service domain(s) 120, the central computing system 106, and/or the cloud computing system service domain(s) 130) to another. For example, the network 110 may include a local area network (LAN), wide area network (WAN), intranet, or a combination thereof. The network 110 may include a wired network, a wireless network, or a combination thereof.

Each of the computing cluster service domains 112 may be hosted on a respective computing cluster platform having multiple computing nodes (e.g., each with one or more processor units, volatile and/or non-volatile memory, communication or networking hardware, input/output devices, or any combination thereof) and may be configured to host a respective PaaS software stack 114. Each of the bare metal system service domain(s) 120 may be hosted on a respective bare metal computing platform (e.g., each with one or more processor units, volatile and/or non-volatile memory, communication or networking hardware, input/output devices, or any combination thereof) and may be configured to host a respective PaaS software stack 122. Each of the cloud computing system service domain(s) 130 may be hosted on a respective public or private cloud computing platform (e.g., each including one or more data centers with a plurality of computing nodes or servers having processor units, volatile and/or non-volatile memory, communication or networking hardware, input/output devices, or any combination thereof) and may be configured to host a respective PaaS software stack 132. "Computing platform" as used herein may refer to any one or more of a computing cluster platform, a bare metal system platform, or a cloud computing platform. "Service domain" as used herein may refer to any of the computing cluster service domains 112, the bare metal system service domain(s) 120, or the cloud computing system service domain(s) 130. The PaaS software stacks (e.g., any of the PaaS software stack 114, the PaaS software stack 122, and/or the Paas software stack 132) may include platform-specific software configured to operate on the respective system. The software may include instructions that are stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform functions, methods, etc., described herein. In this manner, a service domain generally refers to a one or more services which may be installed on (e.g., hosted by) a particular computing platform. The service domain may contain abstracted versions of services that may be configured as needed to run on the particular computing platform on which the service domain will be installed. In this manner, service domains may be present on any of a variety of computing platforms and nonetheless form a distributed computing system across platforms—multiple service domains may, for example, include instances of a same service which may in some examples communicate with other instances of the service across computing platforms to provide a service by the system as a whole. In some examples, centralized management of multiple (e.g., all) instances of a service may be provided, even across the varied computing platforms on which the service domains are instantiated.

The data sources 118, 126, and 136 may each include one or more devices or repositories configured to receive, store, provide, generate, etc., respective source data. The data sources may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, a data lake (e.g., a large capacity data storage system that holds raw data) or any other source of data consumed, retrieved, stored, or generated by the service domains. The service domain construct may allow a customer to deploy applications to locations proximate relevant data, in some examples. In some examples, the service domain construct may allow a customer to deploy applications to computing platforms that have a particular computing resource (e.g., hardware or software configuration) and/or based on computing resource capacity.

In some examples, various components of the system may need access to other cloud services 128. To facilitate communication with the other cloud services 128, the data pipelines of the PaaS software stacks may be configured to provide interfaces between applications hosted on one or more of the service domains 112, 120, or 130 and the other cloud services 128 via the network 110. In some examples, the data pipeline(s) 116, 124, and/or 134 hosted on any of the PaaS software stacks 114, 122, and/or 132, respectively, may be configured to provide data from the other cloud services 128 to applications hosted on one or more of the service domains 112, 120, or 130 to aggregate, transform, store, analyze, etc., the data.

Each of the PaaS software stacks may include one or more applications, data pipelines, ML models, containers, data services, etc., or any combination thereof (e.g., applications). The applications may be configured to receive, process/transform, and output data from and to other applications. The applications may be configured to process respective received data based on respective algorithms or functions to provide transformed data. At least some of the applications may be dependent on availability of supporting services to execute, such as communication services, runtime services, read-write data services, ML inference services, container management services, etc., or any combination thereof.

The data pipelines 116, 124, and/or 134 may provide a conduit through which data can be passed (e.g., provided and/or received) between applications hosted in the PaaS software stack, as well as a conduit through which data can be passed among the different service domains or to the other cloud services 128 via the network 110. Generally, a data pipeline of the data pipelines 116, 124, and/or 134 may include an input component to receive data from another data pipeline, any data source, or other service domain or other cloud services 128 (via the network 110); and at least one transform component configured to manipulate the input data to provide the output data.

The data pipelines 116, 124, and/or 134 can be constructed using computing primitives and building blocks, such as VMs, containers, processes, or any combination thereof. In some examples, the data pipelines 116, 124, and/or 134 may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls.

In some examples, the PaaS software stacks may further include respective ML inference services that are configured to load and execute respective ML model applications. Thus, the ML inference services may be configured to receive a request for an inference or prediction using a ML model, and to load a ML model application that includes the requested ML model into an inference engine. The inference engine may be configured to select a runtime based on a hardware configuration of the edge system, and execute the ML model on input data to provide inference or prediction data. The inference engine may be configured to optimize the ML model for execution based on a hardware configuration. The ML inference service may provide the benefits of GPU abstraction, built-in frameworks for ML model execution, decoupling application development from hardware deployment, etc. In some examples, the PaaS manager 108 may be configured to access data from the one or more data lakes, train a ML model using the transformed data, and generate an ML model application based on the trained ML model.

The one or more applications of the PaaS software stacks may be implemented using a containerized architecture that is managed via a container orchestrator. The container orchestration managed by a PaaS infrastructure and application lifecycle manager (PaaS manager 108) under the service domain construct may handle (e.g., using middleware) underlying details of the PaaS related to containerized management complexity, orchestration, security, and isolation, thereby making it easier for a customer or user to focus on managing the applications. The management may be scalable via categories. In some examples, the service domains may be configured to support multi-tenant implementations, such that data is kept securely isolated between tenants. The applications communicate using application programming interface (API) calls, in some examples. In some examples, the supporting services may also be implemented in the containerized architecture.

The PaaS manager 108 hosted on the central computing system 106 may be configured to centrally manage the PaaS infrastructure (e.g., including the service domains) and manage lifecycles of deployed applications. The central computing system 106 may include one or more computing nodes configured to host the PaaS manager 108. The central computing system 106 may include a cloud computing system and the PaaS manager 108 may be hosted in the cloud computing system and/or may be delivered/distributed using a software as a service (SaaS) model, in some examples. In some examples, the PaaS manager 108 may be distributed across a cluster of nodes of the central computing system 106.

In some examples, an administrative computing system 102 may be configured to host a PaaS manager interface 104. The PaaS manager interface 104 may be configured to facilitate user or customer communication with the PaaS manager 108 to control operation of the PaaS manager 108. The PaaS manager interface 104 may include a graphical user interface (GUI), APIs, command line tools, etc., that are each configured to facilitate interaction between a user and the PaaS manager 108. The PaaS manager interface 104 may provide an interface that allows a user to develop template applications for deployment of the service domains, identify on which service domains to deploy applications, move applications from one service domain to another, remove an application from a service domain, update an application, service domain, or PaaS software stack (e.g., add or remove available services, update deployed services, etc.).

In some examples, the PaaS manager 108 may be configured to manage, for each of the computing platforms, creation and deployment of service domains, creation and deployment of application bundles to the PaaS software stacks, etc. For example, the PaaS manager 108 may be configured to create and deploy service domains on one or more of the computing platforms. The computing platforms may include different hardware and software architectures that may be leveraged to create and deploy a service domain. Thus, the PaaS manager 108 may be configured to manage detailed steps associated with generating a service domain in response to a received request.

The PaaS manager 108 may also be configured to build and deploy different types of applications to one or more of the service domains. A user may elect to deploy an application to a type of platform based on various criteria, such as type of and/or availability of a service, proximity to source data, available computing resources (e.g., both type and available capacity), platform cost, etc., physical location of the platform, or any combination thereof.

When an application is generated, successful execution may depend on availability of various additional supporting services, such as a read/write data services (e.g., publish/subscribe service, search services, etc.), ML inference services, container management services, runtime services, etc., or any combination thereof. The PaaS manager 108 may abstract deployment of the additional supporting services, as some of these may be platform-specific. Thus, a user may provide information directed to an application to be deployed to the PaaS manager 108 and identify one or more target service domains, and the PaaS manager 108 may deploy the application to the target service domains. The target service domains provide services to be used by the application, and accordingly, the application need not include services provided by the service domain. Moreover, the application need not take platform-specific actions which may be typically required for starting those services. The PaaS manager 108 may deploy the respective application to the corresponding one of the one or more identified target service domains.

The ability of the PaaS manager 108 to abstract platform-specific details for creating and deploying a service domain and creating and deploying an application or application bundle to run in a service domain may make deployment of applications to different service domains more efficient for a user, as well as may provide a customer with a wider selections of platforms than would otherwise be considered. Thus, the service domain construct may allow a customer to focus on core concerns with an application, while shifting consideration of supporting services to the PaaS manager 108 and the service domains. The service domain construct may also make applications more "light weight" and modular for more efficient deployment to different service domains. The PaaS manager interface 104 may provide a GUI interface for selecting a type of application to be deployed to one or more service domains, in accordance with an embodiment of the present disclosure.

Figure 2:
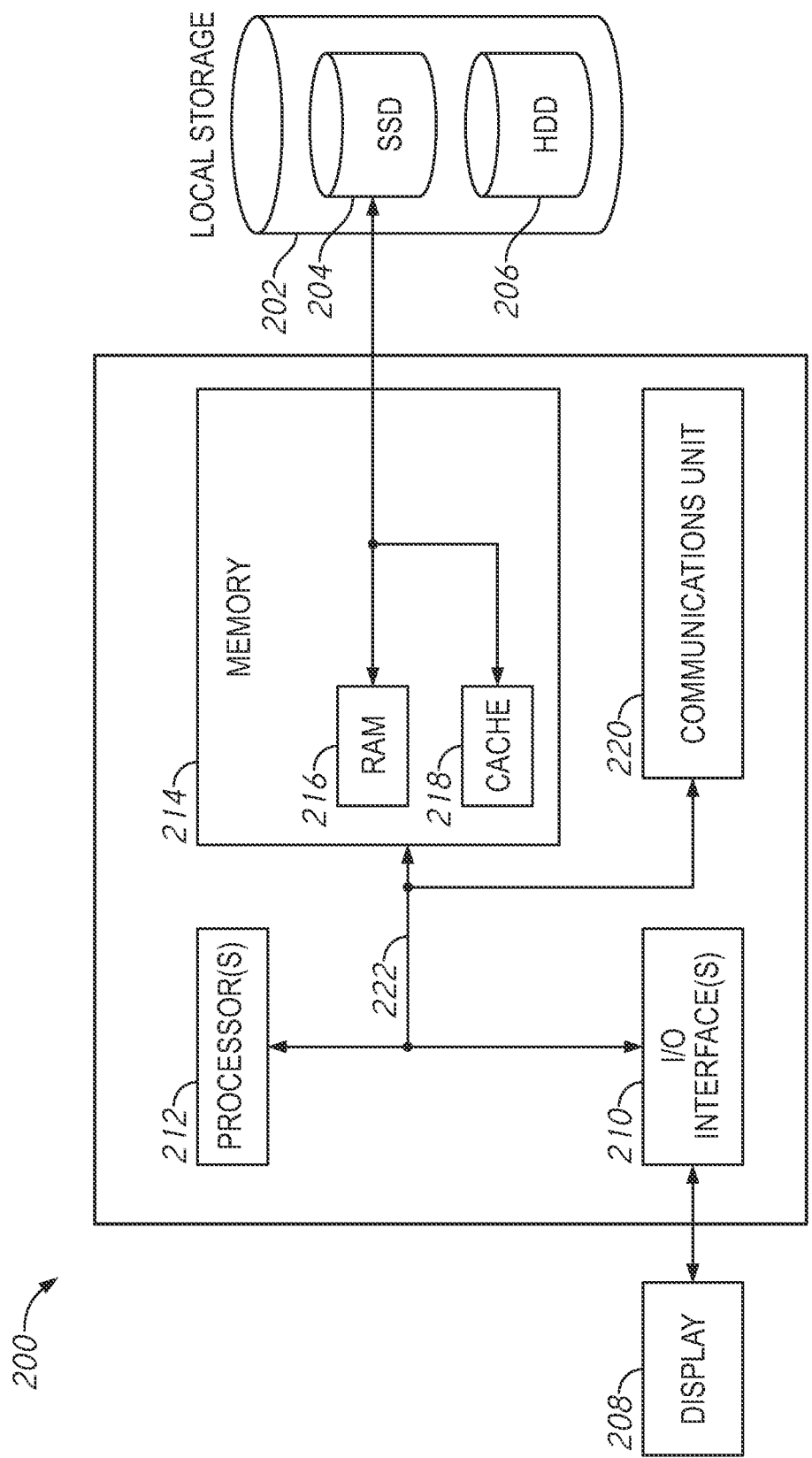
FIG. 2 is a block diagram of components of a computing node in accordance with an embodiment of the present disclosure.

FIG. 2 is a block diagram of a computing node 200, in accordance with an embodiment of the present disclosure. The computing node 200 may be implemented as part of a cluster of computing nodes forming the computing cluster, the bare metal computing platform, or the cloud computing platform described with reference to FIG. 1 configured to host the described service domains.

The computing node 200 includes a communications fabric 222, which provides communication between one or more processor(s) 212, memory 214, local storage 202, communications unit 220, and I/O interface(s) 210. The communications fabric 222 can be implemented with any architecture designed for passing data and/or control information between processors (such as microprocessors, communications and network processors, etc.), system memory, peripheral devices, and any other hardware components within a system. For example, the communications fabric 222 can be implemented with one or more buses.

The memory 214 and the local storage 202 are computer-readable storage media. In this embodiment, the memory 214 includes random access memory RAM 216 and cache 218. In general, the memory 214 can include any suitable volatile or non-volatile computer-readable storage media. In an embodiment, the local storage 202 includes an SSD 204 and an HDD 206.

Various computer instructions, programs, files, images, etc., may be stored in local storage 202 for execution by one or more of the respective processor(s) 212 via one or more memories of memory 214. In some examples, local storage 202 includes a magnetic HDD 206. Alternatively, or in addition to a magnetic hard disk drive, local storage 202 can include the SSD 204, a semiconductor storage device, a read-only memory (ROM), an erasable programmable read-only memory (EPROM), a flash memory, or any other computer-readable storage media that is capable of storing program instructions or digital information.

The media used by local storage 202 may also be removable. For example, a removable hard drive may be used for local storage 202. Other examples include optical and magnetic disks, thumb drives, and smart cards that are inserted into a drive for transfer onto another computer-readable storage medium that is also part of local storage 202.

Communications unit 220, in some examples, provides for communications with other data processing systems or devices. In these examples, communications unit 220 includes one or more network interface cards. Communications unit 220 may provide communications through the use of either or both physical and wireless communications links.

I/O interface(s) 210 allow for input and output of data with other devices that may be connected to a computing node 200. For example, I/O interface(s) 210 may provide a connection to external devices such as a keyboard, a keypad, a touch screen, and/or some other suitable input device. External devices can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 202 via I/O interface(s) 210. I/O interface(s) 210 may also connect to a display 208.

Display 208 provides a mechanism to display data to a user a may be, for example, a computer monitor. In some examples, a GUI associated with the PaaS manager interface 104 may be presented on the display 208.

Figure 3:
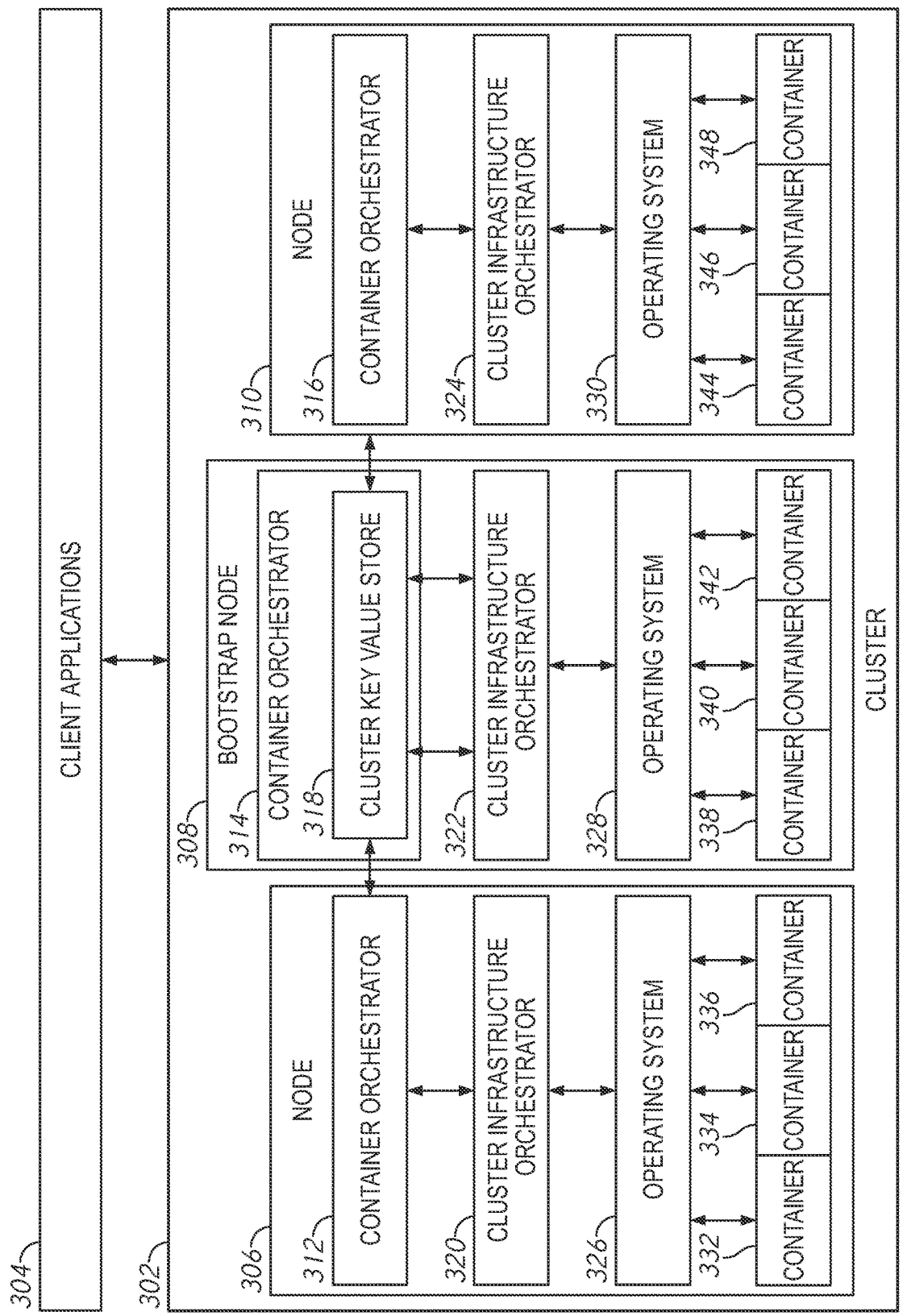
FIG. 3 is a block diagram of a clustered computing service, in accordance with an embodiment of the present disclosure.

FIG. 3 is a block diagram of a clustered computing system, in accordance with examples described herein. Cluster 302 may implement, for example, the computing cluster service domain 112 described with respect to FIG. 1. In such implementations, the PaaS software stack 114 may include, at each node, a container orchestrator, cluster infrastructure orchestrator, operating system, and containers as shown in FIG. 3. Further, the PaaS software stack 114 may include additional software not shown in FIG. 3. Further, the nodes of the cluster 302 may each be implemented using hardware described with respect to computing node 200. FIG. 3 depicts a cluster 302 which may be used to provide services to one or more client applications 304. While the client applications 304 are depicted outside of cluster 302 it is to be understood that in some examples one or more client applications 304 may be hosted on one or more nodes of the cluster 302. The cluster 302 includes node 306, bootstrap node 308, and node 310. The node 306 includes container orchestrator 312, cluster infrastructure orchestrator 320, operating system 326, and container 332, container 334, and container 336. The bootstrap node 308 includes container orchestrator 314. The container orchestrator 314 includes (e.g., hosts and/or manages) cluster key value store 318. The bootstrap node 308 includes cluster infrastructure orchestrator 322, operating system 328, and container 338, container 340, and container 342. The node 310 includes container orchestrator 316, cluster infrastructure orchestrator 324, operating system 330, and container 334, container 346, and container 348. The components of FIG. 3 are exemplary—additional, fewer, and/or different components may be used in other examples.

Examples described herein accordingly include one or more clusters, such as cluster 302 of FIG. 3. A cluster may include a number of computing nodes. While the cluster 302 is shown with three nodes, including a bootstrap node 308, various clustered computing systems may be implemented with different numbers of computing nodes (e.g., 4, 5, 6, 7, 8, 9, 10, or another number of nodes), including, in some embodiments, multiple bootstrap nodes. Generally, a cluster refers to multiple computing nodes which may cooperate to provide one or more software services—e.g., the cluster serves as a distributed system. Multiple nodes may run instances of a same service and may collaborate to provide the service to one or more client applications, such as client applications 304 of FIG. 3. The cluster of computing nodes may accordingly pool one or more resources, such as storage and/or computing resources in providing a service, as portions of the storage and/or compute resources used to provide the service may be divided among one or more of the computing nodes.

Examples of computing nodes in clusters described herein may have operating systems. For example, the nodes 306, 308, and 310 of the cluster 302 include an operating system (e.g., operating systems 326, 328, and 330) configured to interface with the physical layer of each respective computing node. Any type of operating system may be used in various examples.

Examples of computing nodes in clusters described herein may have one or more cluster infrastructure orchestrators, which may also be called a cluster orchestrator. For example, FIG. 3 depicts cluster infrastructure orchestrators 320, 322, and 324. The cluster infrastructure orchestrator on each node may also be referred to as an instance of a cluster orchestrator. In some examples, multiple instances of cluster orchestrators (e.g., instances installed on different nodes) may collaborate to manage some or all of the infrastructure of the cluster, such as cluster 302. The cluster orchestrators may be provided on (e.g., may run on or above) the operating systems of the computing nodes. Cluster infrastructure orchestrators may generally be implemented using software (e.g., a container and/or virtual machine). Cluster infrastructure orchestrators may be used to manage the cluster (e.g., manage a lifecycle of the cluster). For example, a cluster infrastructure orchestrator may manage infrastructure for the cluster, such as drivers, hardware, docker routines, and resources of the nodes 306, 308, and 310 of the cluster 302. The cluster infrastructure orchestrator may in some examples manage addition of one or more nodes to a cluster, removal (e.g., subtraction) of one or more nodes of a cluster, and/or installation and/or upgrade of software on nodes in a cluster. In order to manage a cluster, the cluster orchestrator may utilize, create, and/or update certain data (e.g., metadata) about the cluster. Examples of metadata used to manage a cluster may include a number of nodes in the cluster, hardware identifiers of hardware on nodes of the cluster (e.g., number and types of processing at each node, memory at each node), hardware specifications, and resource allocation among the nodes.

Examples of computing nodes in clusters described herein may have a container orchestrator, such as container orchestrator 312, container orchestrator 314, and/or container orchestrator 316 of FIG. 3. A container orchestrator (e.g., container orchestrators 312, 314, and 316) may be included at any number of nodes of the cluster computing service (e.g., all nodes). Generally, the container orchestrator may deploy, configure, and/or manage containers on one or more computing nodes in a cluster. The container orchestrator may be configured to manage a containerized architecture of one or more runtime services, applications, data services, and/or tools. In some examples, the container orchestrator may be implemented using and/or include Kubernetes® container orchestration software. Runtime services may include containers, functions, machine learning, AI inferencing, data pipelines, or any combination thereof. The data services may include publish/subscribe services, file system storage, databases, block storage, object storage, or any combination thereof. Tools may include real-time monitoring tools, debugging tools, logging tools, alerting tools, or any combination thereof. The applications may include any executable application configured to run in a PaaS software stack. Such services, applications, data services, and/or tools may run within containers managed by the container orchestrator (e.g., containers 332-348). The container orchestrator on each node may also be referred to as an instance of a container orchestrator. In some examples, multiple instances of container orchestrators (e.g., instances installed on different nodes) may collaborate to manage some or all of the containers deployed in the cluster, such as cluster 302. Container orchestrators may generally be implemented using software.

Generally, container orchestrators may be dependent on (e.g., may be in a higher software layer than) cluster infrastructure orchestrators. That is, typically, the container orchestrators may require the cluster infrastructure orchestrator to be operational prior to starting up (e.g., operating) the container orchestrator.

In examples described herein, a container orchestrator, such as container orchestrator 314 of FIG. 3 may include a key value store, such as cluster key value store 318. The cluster key value store 318 may store key values—e.g., metadata used to manage a cluster, authentication parameters, configuration parameters, or other information—which may be intended for use by cluster orchestrators described herein. During operation, the metadata used to manage a cluster may be provided from one or more cluster infrastructure orchestrators (e.g., cluster infrastructure orchestrator 322, cluster infrastructure orchestrator 320, cluster infrastructure orchestrator 324) to one or more container orchestrators (e.g., container orchestrator 314). In this manner, the metadata used to manage a cluster of computing nodes may be provided from one software layer to a higher software layer. In this manner, cluster orchestrators described herein may have a dependency on container orchestrators. The cluster orchestrators may be dependent on the container orchestrators because they use data stored and/or maintained by the container orchestrators in order to startup and/or operate. Accordingly, it is desirable for the container orchestrator to be running and operational prior to setup and/or operation of the cluster orchestrator. Container orchestrators described herein may manage the key value store in a distributed fashion. For example, instances of container orchestrators within a cluster—e.g., container orchestrator 312, container orchestrator 314, and container orchestrator 316—of FIG. 3 may cooperate to provide access to cluster key value store 318 by any of the instances of the container orchestrator, regardless of node availability (e.g., failure). For example, the container orchestrator 314 may manage cluster key value store 318 such that even if bootstrap node 308 were to fail and/or be unavailable or removed from cluster 302, access to the cluster key value store 318 may be maintained through container orchestrator 312 and/or container orchestrator 316. In this manner, storing cluster key value store 318 with a container orchestrator may avoid a need to store and/or a copy of the cluster key value store 318 on local memory of each computing node. Instead, the cluster key value store 318 may be stored in memory accessible to a distributed system (e.g., distributed across multiple nodes, with redundancy in some examples).

In examples described herein, the container orchestrator may be present in a different software layer than the cluster orchestrator of a same or different node. For example, inputs and outputs for communication between layers may be defined. In some examples, the container orchestrator may be provided in a higher software layer than the cluster orchestrator, which may reside in a lower software layer. Typically, software in a lower software layer will be started up and/or configured prior to startup and/or configuration of software in a higher software layer. Software in a higher software layer may have dependencies on software in a lower software layer. In examples described herein, the container orchestrator(s) may have dependencies on the cluster infrastructure orchestrator(s). For example, for proper operation of the container orchestrator, the cluster infrastructure orchestrator on a same node should be operational. Accordingly, software in a lower software layer typically may not be expected to have dependencies on software from a higher software layer. However, in examples described herein, cluster infrastructure orchestrators, such as cluster infrastructure orchestrator 322 of FIG. 3 may in practice have one or more dependencies on a container orchestrator present in a higher software layer, such as container orchestrator 314 of FIG. 3. The dependency refers to the need for the higher software layer (e.g., container orchestrator 314) to be operational in order for the lower software layer (e.g., cluster infrastructure orchestrator 322) to operate. Further, as the higher software layer (e.g., container orchestrator 314) may have one or more dependencies on the lower software layer (e.g., the cluster infrastructure orchestrator 322), the software layers may be reciprocally dependent (e.g., each having dependencies on the other).

In examples described herein, aspects of the clustered nature of the computing environment may be utilized to increase and/or ensure resilient operation of the computing nodes despite the dependency of a lower level software layer (e.g., cluster orchestrators) higher level software layers (e.g., container orchestrators). For example, one or more nodes of the cluster may be a bootstrap node, such as bootstrap node 308 of FIG. 3. Generally, the bootstrap node may be a node which may initiate formation of a computing cluster, such as cluster 302. The container orchestrator 314 on the bootstrap node 308 may initially include a cluster key value store 318. The cluster key value store 318 may store cluster metadata used by the cluster infrastructure orchestrators 320, 322, and 324 for lifecycle management of the cluster.

Each cluster infrastructure orchestrator layer is configured with a dependency on the container orchestrator 314 of the bootstrap node 308. Accordingly, each cluster infrastructure orchestrator 320, 322, and 324 can access the cluster key value store 318 to use cluster metadata stored at the cluster key value store 318. Accordingly, where the cluster is scaled (e.g., by adding an additional node), the cluster infrastructure orchestrator of the new node can be configured with a dependency on the container orchestrator 314 of the bootstrap node 308 to access the cluster key value store 318 instead of a separate cluster key value store being created at the new node. Additionally, updated cluster metadata (e.g., metadata reflecting the additional node) is added to the shared cluster key value store 318 such that each individual cluster infrastructure orchestrator does not need to be updated to reflect changed metadata. Similarly, in the event of node failure or node reboot, the shared cluster key value store 318 can be updated and the cluster infrastructure orchestrator of the rebooted node may be configured to reference the shared cluster key value store 318 at the bootstrap node 308.

When a cluster is initially setup, a cluster infrastructure orchestrator may be installed on a bootstrap node. The metadata used by the cluster orchestrator of the bootstrap node, e.g., cluster infrastructure orchestrator 322 of FIG. 3, may initially be stored with the cluster orchestrator, because it may be started prior to the higher level container orchestrator (e.g., container orchestrator 314). As the computing node continues to be set up, a container orchestrator may be installed. The container orchestrator may include a key value store. Once the higher level container orchestrator comes up (e.g., is operational), the cluster infrastructure orchestrator 322 may provide the metadata and/or other key values to the container orchestrator 314 for storage in the cluster key value store 318. A pointer may be created, updated, and/or maintained on the cluster infrastructure orchestrator which points to the provider of the key value store (e.g., metadata for use in managing the cluster). For example, a pointer may be generated which may initially point to metadata stored by the container orchestrator prior to that metadata being copied and/or provided to the container orchestrator. Once the metadata is provided to the container orchestrator, the pointer may be updated to point to the container orchestrator (e.g., container orchestrator 314) and or the key value store maintained by the container orchestrator (e.g., cluster key value store 318) to obtain metadata for use in managing the cluster.

As other nodes come up, their cluster orchestrators (e.g., cluster infrastructure orchestrator 320 and cluster infrastructure orchestrator 324) may access cluster key value store 318 from a different node than their own node (e.g., from bootstrap node 308) in order to access (e.g., obtain) the metadata used to manage the cluster. In this manner, cluster orchestrators on other nodes may be able to start up prior to startup of the container orchestrators on their own nodes, because they can access the key value store through the container orchestrator of the bootstrap node. For example, a second node may be added to the cluster (e.g., node 306 may be added to cluster 302 of FIG. 3). When a cluster infrastructure orchestrator is installed and operational on the additional node, the cluster infrastructure orchestrator may communicate with the bootstrap node to update the metadata stored in the key value store for use in managing the cluster (e.g., update a number of nodes in the cluster responsive to the addition of the new node). In operation, as needed by cluster infrastructure orchestrators, the cluster infrastructure orchestrators may request metadata from the container orchestrator(s) managing a key value store. For example, the cluster infrastructure orchestrator 322 may request metadata from the container orchestrator 314 managing the cluster key value store 318. Likewise, the cluster infrastructure orchestrator 320 may request metadata from the container orchestrator 314 managing the cluster key value store 318. Note that the management of the key value store by the container orchestrator may be failure resistant, such that if a node having the key value store (e.g., bootstrap node 308 of FIG. 3) fails, a cluster infrastructure orchestrator of any other node may obtain the metadata from another container orchestrator (e.g., container orchestrator 312 and/or container orchestrator 316). The other container orchestrator may in some examples be a second bootstrap node in the cluster, or in some examples may be another node configured to receive management of the distributed key value store responsive to (e.g., following) failure of the bootstrap node.

In various implementations, clusters may include multiple bootstrap nodes, each having a cluster key value store to further protect the cluster from node failure. For example, where one of the multiple bootstrap nodes fails, cluster infrastructure orchestrators on the non-bootstrap nodes may reference the cluster key value store on the remaining bootstrap node.

Figure 4:
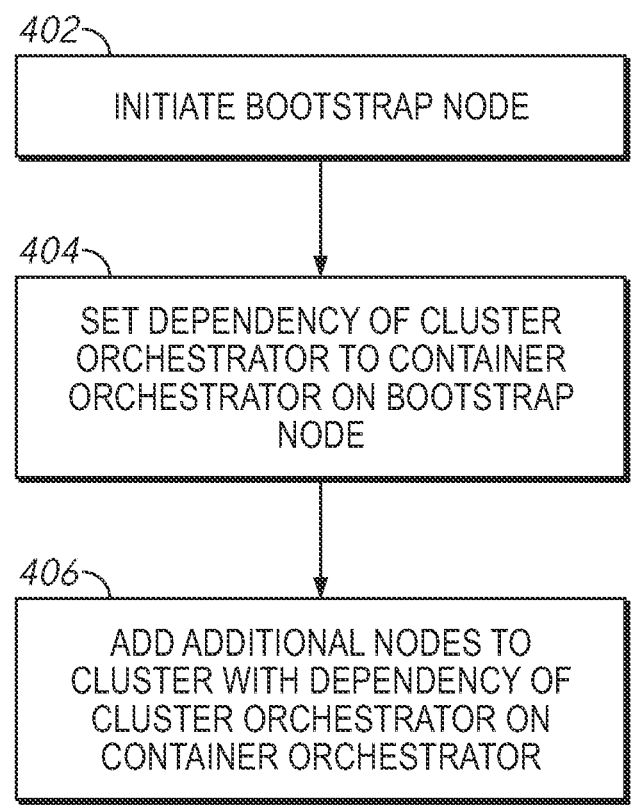
FIG. 4 is a flow diagram of a method to configure a clustered computing service, in accordance with an embodiment of the disclosure.

FIG. 4 is a flow diagram of a method to configure a clustered computing service, in accordance with an embodiment of the disclosure. In block 402, a bootstrap node is initiated. In various implementations, the bootstrap node may be the bootstrap node 308 of a cluster 302. Initiation of the bootstrap node may include installation and/or configuration of a PaaS software stack on the bootstrap node. The PaaS software stack includes at least an operating system, cluster infrastructure orchestrator, and container orchestrator. In various implementations, additional software and/or binaries may be included with the PaaS software stack.

Installation of the software stack may first bring up (e.g., start up) the operating system 328 at the bootstrap node 308 to provide an interface between the hardware of the bootstrap node 308 and software running on the bootstrap node 308. Once the operating system 328 is installed and initiated, the cluster infrastructure orchestrator 322 is initiated, running on the operating system 328. At the time the cluster infrastructure orchestrator 322 is initiated, cluster metadata used by the cluster infrastructure orchestrator 322 may be stored at the cluster infrastructure orchestrator 322. A container orchestrator 314 may be initiated (e.g., installed) above the cluster infrastructure orchestrator 322 after initiation of the cluster infrastructure orchestrator 322. When the container orchestrator 314 is initiated (e.g., installed), the cluster metadata stored locally at the cluster infrastructure orchestrator 322 may be moved and/or copied to a cluster key value store 318 at the container orchestrator 314.

In block 404, a dependency of the cluster orchestrator is set to the container orchestrator on the bootstrap node. For example, after moving the cluster metadata from the cluster infrastructure orchestrator 322 to the cluster key value store 318, the cluster infrastructure orchestrator 322 may be configured with a dependency on the container orchestrator 314 to access the cluster metadata. In this manner, a dependency may be created such that the cluster orchestrator is dependent on the container orchestrator for proper operation. The cluster infrastructure orchestrator 322 may then access cluster metadata stored at the cluster key value store 318 to perform lifecycle management operations for the bootstrap node 308 of the cluster 302.

In block 406, additional nodes are added to the cluster with dependencies of the cluster orchestrator on the container orchestrator. For example, the node 306 may be configured as part of the cluster 302 by installing and initializing a PaaS software stack on the node 306. The operating system 326 may be installed and initialized first to provide a platform for other software on the node 306. When the cluster infrastructure orchestrator 320 is initialized at the node 306, the cluster infrastructure orchestrator 320 may be configured with a dependency on the container orchestrator 314 of the bootstrap node 308 for access to the cluster key value store 318. The container orchestrator 312 may then be initialized above the cluster infrastructure orchestrator 320.

Additional nodes may be added to the cluster 302 in a similar manner, where cluster infrastructure orchestrators of additional nodes are configured with dependencies on the container orchestrator 314 of the bootstrap node 308 for access to the cluster key value store 318. During the lifecycle of the cluster, cluster metadata at the cluster key value store 318 may be updated as nodes are added to or removed from the cluster or as the PaaS software stack is updated at the nodes of the cluster.

While certain components are shown in the figures and described throughout the specification, other additional, fewer, and/or alternative components may be included in the cluster 302 or other computing systems. Such additional, fewer, and/or alternative components are contemplated to be within the scope of this disclosure.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals may be provided directly to and/or received directly from the recited components without intervening components, but also may be provided to and/or received from the certain components through intervening components.

What is claimed is:

1. At least one non-transitory computer readable medium encoded with instructions which, when executed, cause a cluster orchestrator hosted at a second computing node to:
   provide a key value used to manage a cluster of computing nodes, including the second computing node, from the cluster orchestrator hosted at the second computing node to a key value store included in a container orchestrator hosted at a bootstrap computing node of the cluster of computing nodes, the providing of the key value to the cluster orchestrator creating a dependency of the cluster orchestrator on the container orchestrator;
   manage, from the cluster orchestrator hosted at the second computing node of the cluster of computing nodes, at least a portion of infrastructure for the cluster of computing nodes, the cluster orchestrator using the key value stored in the container orchestrator hosted at the bootstrap computing node; and
   provide, to an instance of the container orchestrator on another computing node of the cluster of computing nodes, access to the key value store included in the container orchestrator hosted at the bootstrap computing node, wherein access to the key value store is used to initialize the another computing node.

2. The at least one non-transitory computer readable medium of claim 1, wherein the key value store comprises a number of nodes in the cluster of computing nodes, hardware identifiers for nodes in the cluster of computing nodes, or combinations thereof.

3. The at least one non-transitory computer readable medium of claim 1, wherein said manage at least the portion of infrastructure comprises upgrading software on one or more nodes in the cluster of computing nodes.

4. The at least one non-transitory computer readable medium of claim 1, wherein the instructions, when executed, further cause the cluster orchestrator of the second computing node to:
   update a pointer from the cluster orchestrator to the container orchestrator.

5. The at least one non-transitory computer readable medium of claim 1, wherein a higher software layer comprises the container orchestrator.

6. The at least one non-transitory computer readable medium of claim 5, wherein a first software layer comprises the cluster orchestrator.

7. The at least one non-transitory computer readable medium of claim 1, wherein the container orchestrator comprises metadata included in the key value store.

8. The at least one non-transitory computer readable medium of claim 1, wherein the cluster of computing nodes is a plurality of computing nodes.

9. The at least one non-transitory computer readable medium of claim 1, wherein the bootstrap computing node comprises a second cluster orchestrator.

10. The at least one non-transitory computer readable medium of claim 1, wherein the managing the at least the portion of the infrastructure for the cluster of computing nodes comprises, rebooting one or more nodes in the cluster of computing nodes, upgrading the one or more nodes in the cluster of computing nodes, adding another node to the one or more nodes in the cluster of computing nodes, or combinations thereof.

11. The at least one non-transitory computer readable medium of claim 1, wherein the bootstrap computing node and the second computing node are in a same cluster.

12. A method comprising:
providing, by a cluster orchestrator, key value used to manage a cluster of computing nodes, including a second computing node, from the cluster orchestrator hosted at the second computing node, to a key value store included in a container orchestrator hosted at a bootstrap computing node of the cluster of computing nodes, the providing of the key value to the cluster orchestrator creating a dependency of the cluster orchestrator on the container orchestrator;
managing, from the cluster orchestrator hosted at the second computing node of the cluster of computing nodes, at least a portion of infrastructure for the cluster of computing nodes, the cluster orchestrator using the key value stored in the container orchestrator hosted at the bootstrap computing node; and
providing, to an instance of the container orchestrator on another computing node of the cluster of computing nodes, access to the key value store included in the container orchestrator hosted at the bootstrap computing node, wherein access to the key value store is used to initialize the another computing node.

13. The method of claim 12, wherein the container orchestrator is higher than the cluster orchestrator.

14. The method of claim 12, wherein the key value store comprises a number of nodes in the cluster of computing nodes, hardware identifiers for nodes in the cluster of computing nodes, or combinations thereof.

15. The method of claim 12, wherein managing the at least the portion of infrastructure further comprises upgrading software on one or more nodes in the cluster of computing nodes.

16. The method of claim 12, wherein a first software layer comprises the cluster orchestrator, and a second software layer comprises the container orchestrator.

17. The method of claim 12, wherein the container orchestrator comprises metadata included in the key value store.

18. The method of claim 12, wherein the cluster of computing nodes is a plurality of computing nodes.

19. The method of claim 12, wherein the container orchestrator is located at the bootstrap computing node and wherein the bootstrap computing node comprises a second cluster orchestrator.

20. The method of claim 12, wherein managing the at least the portion of infrastructure for the cluster of computing nodes comprises, rebooting one or more nodes in the cluster of computing nodes, upgrading the one or more nodes in the cluster of computing nodes, adding another node to the one or more nodes in the cluster of computing nodes, or combinations thereof.

21. The method of claim 12, wherein the bootstrap computing node and the second computing node are in a same cluster.

22. A system comprising:
a cluster orchestrator hosted at a second computing node and configured to manage a cluster of computing nodes within a containerized computing system; and
a container orchestrator hosted at a bootstrap computing node of the cluster of computing nodes and configured to manage one or more containers used on one or more nodes of the cluster of computing nodes, wherein:
the cluster orchestrator is further configured to:
provide a key value used to manage the cluster of computing nodes, including the second computing node, from the cluster orchestrator hosted at the second computing node to a key value store included in the container orchestrator hosted at the bootstrap computing node of the cluster of computing nodes, the providing of the key value to the cluster orchestrator creating a dependency of the cluster orchestrator on the container orchestrator,
manage, from the cluster orchestrator hosted at the second computing node of the cluster of computing nodes, at least a portion of infrastructure for the cluster of computing nodes, the cluster orchestrator using the key value stored in the container orchestrator hosted at the bootstrap computing node, and
provide, to an instance of the container orchestrator on another computing node of the cluster of computing nodes, access to the key value store included in the container orchestrator hosted at the bootstrap computing node, wherein access to the key value store is used to initialize the another computing node.

23. The system of claim 22, wherein the key value store comprises a number of nodes in the cluster of computing nodes, hardware identifiers for nodes in the cluster of computing nodes, or combinations thereof.

24. The system of claim 22, wherein the cluster orchestrator is further configured to manage at least a portion of infrastructure for the cluster of computing nodes by upgrading software on the one or more nodes in the cluster of computing nodes.

25. The system of claim 22, the cluster orchestrator is further configured to update a pointer from the cluster orchestrator to the container orchestrator.

26. The system of claim 22, wherein the container orchestrator comprises metadata, wherein the metadata is included in the key value store.

27. The system of claim 22, wherein the cluster of computing nodes is a plurality of computing nodes.

28. The system of claim 22, wherein the container orchestrator is located at the bootstrap computing node and wherein the bootstrap computing node comprises a second cluster orchestrator.

29. The system of claim 22, wherein managing the at least the portion of infrastructure for the cluster of computing nodes comprises, rebooting the one or more nodes in the cluster of computing nodes, upgrading the one or more nodes in the cluster of computing nodes, adding another node to the one or more nodes in the cluster of computing nodes, or combinations thereof.

30. The system of claim 22, wherein the bootstrap computing node and the second computing node are in a same cluster.

\* \* \* \* \*